US011641125B2

(12) United States Patent
Seta et al.

(10) Patent No.: US 11,641,125 B2
(45) Date of Patent: May 2, 2023

(54) VEHICULAR POWER SUPPLY DEVICE

(71) Applicant: SUBARU CORPORATION, Tokyo (JP)

(72) Inventors: Itaru Seta, Tokyo (JP); Hiroyuki Suzuki, Tokyo (JP); Yosuke Ohtomo, Tokyo (JP); Masaki Komura, Tokyo (JP); Takashi Kono, Tokyo (JP); Kazuki Makino, Tokyo (JP); Shinya Sagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/411,886

(22) Filed: Aug. 25, 2021

(65) Prior Publication Data
US 2022/0085639 A1 Mar. 17, 2022

(30) Foreign Application Priority Data
Sep. 16, 2020 (JP) .............................. JP2020-155184

(51) Int. Cl.
H02J 7/00 (2006.01)
B60L 58/10 (2019.01)
B60L 53/24 (2019.01)
H02P 27/06 (2006.01)

(52) U.S. Cl.
CPC ........ H02J 7/007194 (2020.01); B60L 53/24 (2019.02); B60L 58/10 (2019.02); H02J 7/0013 (2013.01); H02P 27/06 (2013.01); B60L 2240/36 (2013.01)

(58) Field of Classification Search
CPC ... H02J 7/007194; H02J 7/0013; B60L 53/24; B60L 58/10; B60L 2240/36; H02P 27/06
See application file for complete search history.

(56) References Cited

U.S. PATENT DOCUMENTS 11,262,826 B2 * 3/2022 Hand .................... G06F 1/266
2018/0219238 A1 8/2018 Tanaka et al.
2020/0290480 A1 * 9/2020 Tsubaki ................. B60L 58/12

FOREIGN PATENT DOCUMENTS

JP 2006-210244 A 8/2006
JP 2017-077158 A 4/2017
WO WO 2017/017786 A1 2/2017

* cited by examiner

Primary Examiner — Jared Fureman
Assistant Examiner — Duc M Pham
(74) Attorney, Agent, or Firm — McGinn I.P. Law Group, PLLC.

(57) ABSTRACT

A vehicular power supply device to be applied to a vehicle includes an electric storage unit group, a charger, first and second switches, and a switch controller. The electric storage unit group includes a first electric storage unit and a second electric storage unit having higher internal resistance than the first electric storage unit. The charger is coupled to the electric storage unit group and charges one or both of the first electric storage unit and second electric storage unit. The first switch is provided between the first electric storage unit and the charger and controlled between an on state and an off state. The second switch is provided between the second electric storage unit and the charger and controlled between an on state and an off state. The switch controller controls the first and second switches based on a temperature of the electric storage unit group.

20 Claims, 18 Drawing Sheets

VEHICULAR POWER SUPPLY DEVICE

CROSS-REFERENCE TO RELATED APPLICATIONS

The present application claims priority from Japanese Patent Application No. 2020-155184 filed on Sep. 16, 2020, the entire contents of which are hereby incorporated by reference.

BACKGROUND

The disclosure relates to vehicular power supply devices equipped in vehicles.

Vehicles, such as electric automobiles and hybrid vehicles, are equipped with power supply devices having electric storage units, such as batteries (e.g., see PCT International Publication No. WO 2017/017786, Japanese Unexamined Patent Application Publication (JP-A) No. 2017-77158, and JP-A No. 2006-210244). Moreover, vehicles, such as electric automobiles, are equipped with onboard chargers for charging the electric storage units.

SUMMARY

An aspect of the disclosure provides a vehicular power supply device to be applied to a vehicle. The vehicular power supply device includes an electric storage unit group, a charger, a first switch, a second switch, and a switch controller. The electric storage unit group includes a first electric storage unit and a second electric storage unit configured to have higher internal resistance than the first electric storage unit. The charger is configured to be coupled to the electric storage unit group and charge one or both of the first electric storage unit and the second electric storage unit. The first switch is provided between the first electric storage unit and the charger and is configured to be controlled between an on state and an off state. The second switch is provided between the second electric storage unit and the charger and is configured to be controlled between an on state and an off state. The switch controller is configured to control the first switch and the second switch based on a temperature of the electric storage unit group.

An aspect of the disclosure provides a vehicular power supply device to be applied to a vehicle. The vehicular power supply device includes an electric storage unit group, a charger, a first switch, a second switch, and circuitry. The electric storage unit group includes a first electric storage unit and a second electric storage unit configured to have higher internal resistance than the first electric storage unit. The charger is configured to be coupled to the electric storage unit group and charge one or both of the first electric storage unit and the second electric storage unit. The first switch is provided between the first electric storage unit and the charger and is configured to be controlled between an on state and an off state. The second switch is provided between the second electric storage unit and the charger and is configured to be controlled between an on state and an off state. The circuitry is configured to control the first switch and the second switch based on a temperature of the electric storage unit group.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Because the internal resistance of an electric storage unit increases with decreasing temperature of the electric storage unit, it is desirable to increase the temperature of the electric storage unit to enhance the charging efficiency of the electric storage unit in a low-temperature environment. Accordingly, in order to efficiency charge an electric storage unit at low temperatures, it is desirable that the electric storage unit be warmed before being charged.

It is desirable to warm an electric storage unit before charging the electric storage unit.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Battery Pack

Figure 1:
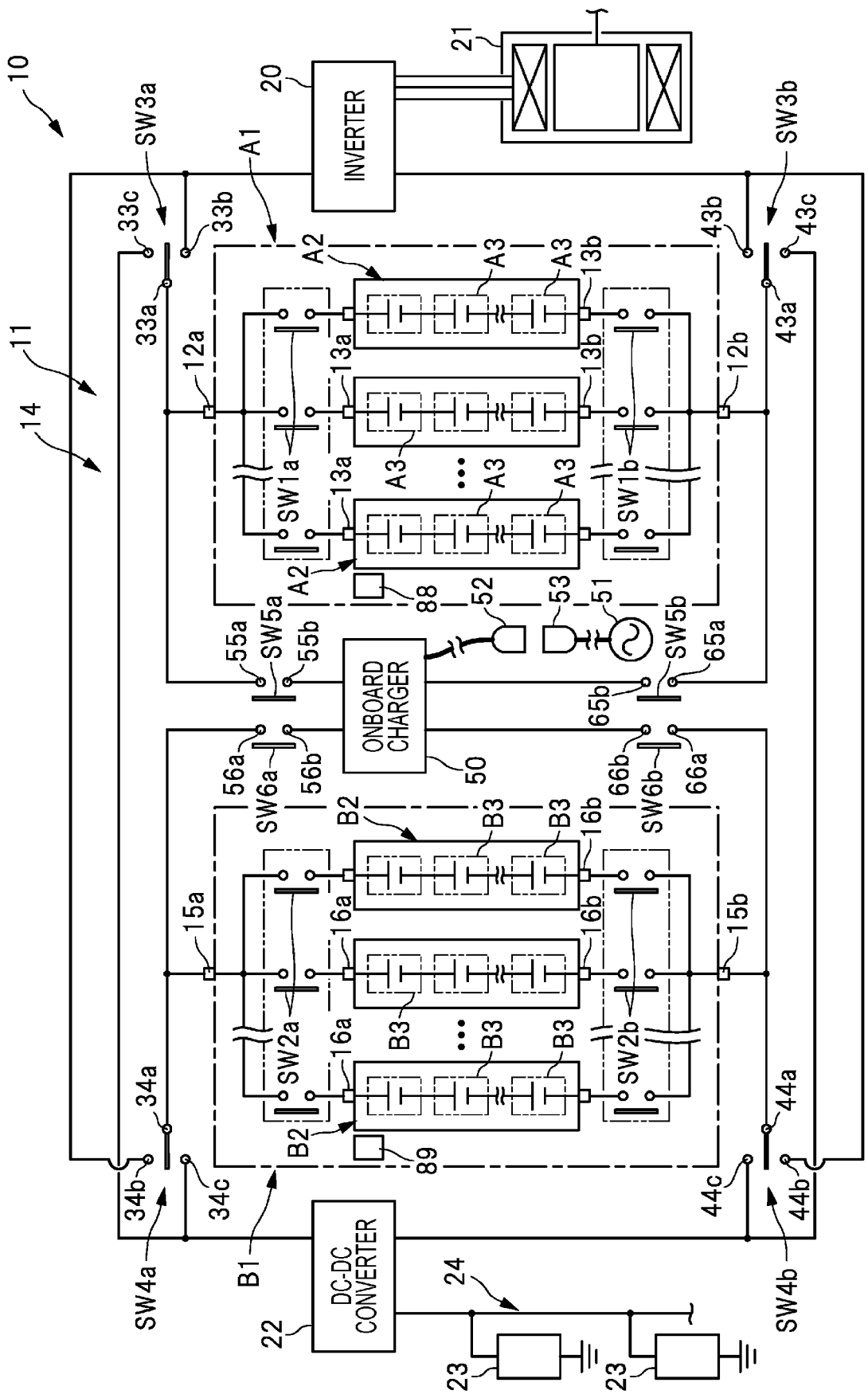
FIG. 1 schematically illustrates a configuration example of a vehicular power supply device according to an embodiment of the disclosure.

FIG. 1 schematically illustrates a configuration example of a vehicular power supply device 10 according to an embodiment of the disclosure. As illustrated in FIG. 1, the vehicular power supply device 10 to be equipped in a vehicle has a battery pack (electric storage unit group) 11 having a stack group A1 and a stack group B1. The stack group A1 is provided with a plurality of parallel-coupled battery stacks (first electric storage unit) A2. Each battery stack A2 is constituted of a plurality of series-coupled battery cells A3. The battery cells A3 are battery cells manufactured as new products, that is, battery cells not previously used in another device. The stack group B1 is provided with a plurality of parallel-coupled battery stacks (second electric storage unit) B2. Each battery stack B2 is constituted of a plurality of series-coupled battery cells (electric storage cell) B3. The battery cells B3 are battery cells manufactured as recycled products, that is, battery cells previously used in another device. The battery stacks A2 and B2 are also called battery modules.

Main Switches

The positive terminal of each battery stack A2 is provided with a main switch SW1a, and the negative terminal of each battery stack A2 is provided with a main switch SW1b. By switching on the main switches SW1a and SW1b, positive terminals 13a of the battery stacks A2 can be coupled to a positive terminal 12a of the stack group A1, and negative terminals 13b of the battery stacks A2 can be coupled to a negative terminal 12b of the stack group A1. That is, by switching on the main switches SW1a and SW1b, the battery stacks A2 can be coupled to a power supply circuit 14 in the battery pack 11. On the other hand, by switching off the main switches SW1a and SW1b, the positive terminals 13a of the battery stacks A2 can be isolated from the positive terminal 12a of the stack group A1, and the negative terminals 13b of the battery stacks A2 can be isolated from the negative terminal 12b of the stack group A1.

Likewise, the positive terminal of each battery stack B2 is provided with a main switch SW2a, and the negative terminal of each battery stack B2 is provided with a main switch SW2b. By switching on the main switches SW2a and SW2b, positive terminals 16a of the battery stacks B2 can be coupled to a positive terminal 15a of the stack group B1, and negative terminals 16b of the battery stacks B2 can be coupled to a negative terminal 15b of the stack group B1. That is, by switching on the main switches SW2a and SW2b, the battery stacks B2 can be coupled to the power supply circuit 14 in the battery pack 11. On the other hand, by switching off the main switches SW2a and SW2b, the positive terminals 16a of the battery stacks B2 can be isolated from the positive terminal 15a of the stack group B1, and the negative terminals 16b of the battery stacks B2 can be isolated from the negative terminal 15b of the stack group B1.

Selector Switches

The battery pack 11 is coupled to a motor generator (driving motor) 21 via an inverter 20. The inverter 20 is constituted of a plurality of switching elements and has a function for performing conversion between alternating-current power of the motor generator 21 and direct-current power of the battery pack 11. The battery pack 11 is also coupled to an electric device group 24 constituted of electric devices 23, such as actuators and controllers, via a converter 22. The converter 22 is a DC-DC converter constituted of a plurality of switching elements and has a function for reducing the direct-current power of the battery pack 11 and outputting the direct-current power to the electric device group 24.

Furthermore, in order to control the coupling state of the inverter 20 and the converter 22 relative to the battery pack 11, the vehicular power supply device 10 is provided with selector switches SW3a, SW3b, SW4a, and SW4b. The selector switch SW3a has a positive terminal 33a to be coupled to the positive terminal 12a of the stack group A1, an inverter terminal 33b to be coupled to the inverter 20, and a converter terminal 33c to be coupled to the converter 22. The selector switch SW3a operates at any one of an inverter position where the positive terminal 33a and the inverter terminal 33b are coupled to each other, a converter position where the positive terminal 33a and the converter terminal 33c are coupled to each other, and a neutral position where the positive terminal 33a is isolated from both the inverter terminal 33b and the converter terminal 33c.

The selector switch SW3b has a negative terminal 43a to be coupled to the negative terminal 12b of the stack group A1, an inverter terminal 43b to be coupled to the inverter 20, and a converter terminal 43c to be coupled to the converter 22. The selector switch SW3b operates at any one of an inverter position where the negative terminal 43a and the inverter terminal 43b are coupled to each other, a converter position where the negative terminal 43a and the converter terminal 43c are coupled to each other, and a neutral position where the negative terminal 43a is isolated from both the inverter terminal 43b and the converter terminal 43c.

By controlling the selector switches SW3a and SW3b to the inverter positions, the stack group A1 is coupled to the inverter 20 via the selector switches SW3a and SW3b. On the other hand, by controlling the selector switches SW3a and SW3b to the converter positions, the stack group A1 is coupled to the converter 22 via the selector switches SW3a and SW3b. Furthermore, by controlling the selector switches SW3a and SW3b to the neutral positions, as illustrated in FIG. 1, the stack group A1 is isolated from both the inverter 20 and the converter 22.

The selector switch SW4a has a positive terminal 34a to be coupled to the positive terminal 15a of the stack group B1, an inverter terminal 34b to be coupled to the inverter 20, and a converter terminal 34c to be coupled to the converter 22. The selector switch SW4a operates at any one of an inverter position where the positive terminal 34a and the inverter terminal 34b are coupled to each other, a converter position where the positive terminal 34a and the converter terminal 34c are coupled to each other, and a neutral position where the positive terminal 34a is isolated from both the inverter terminal 34b and the converter terminal 34c.

The selector switch SW4b has a negative terminal 44a to be coupled to the negative terminal 15b of the stack group B1, an inverter terminal 44b to be coupled to the inverter 20, and a converter terminal 44c to be coupled to the converter 22. The selector switch SW4b operates at any one of an inverter position where the negative terminal 44a and the inverter terminal 44b are coupled to each other, a converter position where the negative terminal 44a and the converter terminal 44c are coupled to each other, and a neutral position where the negative terminal 44a is isolated from both the inverter terminal 44b and the converter terminal 44c.

By controlling the selector switches SW4*a* and SW4*b* to the inverter positions, the stack group B1 is coupled to the inverter 20 via the selector switches SW4*a* and SW4*b*. On the other hand, by controlling the selector switches SW4*a* and SW4*b* to the converter positions, the stack group B1 is coupled to the converter 22 via the selector switches SW4*a* and SW4*b*. Furthermore, by controlling the selector switches SW4*a* and SW4*b* to the neutral positions, as illustrated in FIG. 1, the stack group B1 is isolated from both the inverter 20 and the converter 22.

Charging Switches

The vehicular power supply device 10 is provided with an onboard charger (charger) 50 for charging the battery pack 11 by using an external power source 51. The onboard charger 50 is constituted of, for example, a plurality of switching elements and has a function for converting alternating-current power from the external power source 51 into direct-current power and outputting the direct-current power to the battery pack 11. Moreover, the onboard charger 50 has a function for performing voltage adjustment on the direct-current power of the stack group A1 and outputting the direct-current power to the stack group B1, as well as a function for performing voltage adjustment on the direct-current power of the stack group B1 and outputting the direct-current power to the stack group A1.

When the battery pack 11 is to be charged by using the external power source 51, a charging plug 53 of the external power source 51 is coupled to an inlet 52 of the onboard charger 50. Accordingly, the external power source 51 can be coupled to the battery pack 11 via the onboard charger 50, so that the electric power from the external power source 51 can be supplied to the battery pack 11. Furthermore, in order to control the coupling state of the onboard charger 50 relative to the battery pack 11, the vehicular power supply device 10 is provided with charging switches (first switch) SW5*a* and SW5*b* and charging switches (second switch) SW6*a* and SW6*b*.

The charging switch SW5*a* has a positive terminal 55*a* to be coupled to the positive terminal 12*a* of the stack group A1 and a charging terminal 55*b* to be coupled to the onboard charger 50. Furthermore, the charging switch SW5*b* has a negative terminal 65*a* to be coupled to the negative terminal 12*b* of the stack group A1 and a charging terminal 65*b* to be coupled to the onboard charger 50. By switching on the charging switches SW5*a* and SW5*b*, the onboard charger 50 can be coupled to the stack group A1 of the battery pack 11.

The charging switch SW6*a* has a positive terminal 56*a* to be coupled to the positive terminal 15*a* of the stack group B1 and a charging terminal 56*b* to be coupled to the onboard charger 50. The charging switch SW6*b* has a negative terminal 66*a* to be coupled to the negative terminal 15*b* of the stack group B1 and a charging terminal 66*b* to be coupled to the onboard charger 50. By switching on the charging switches SW6*a* and SW6*b*, the onboard charger 50 can be coupled to the stack group B1 of the battery pack 11.

Disposition of Battery Stacks A2 and B2

Figure 2:
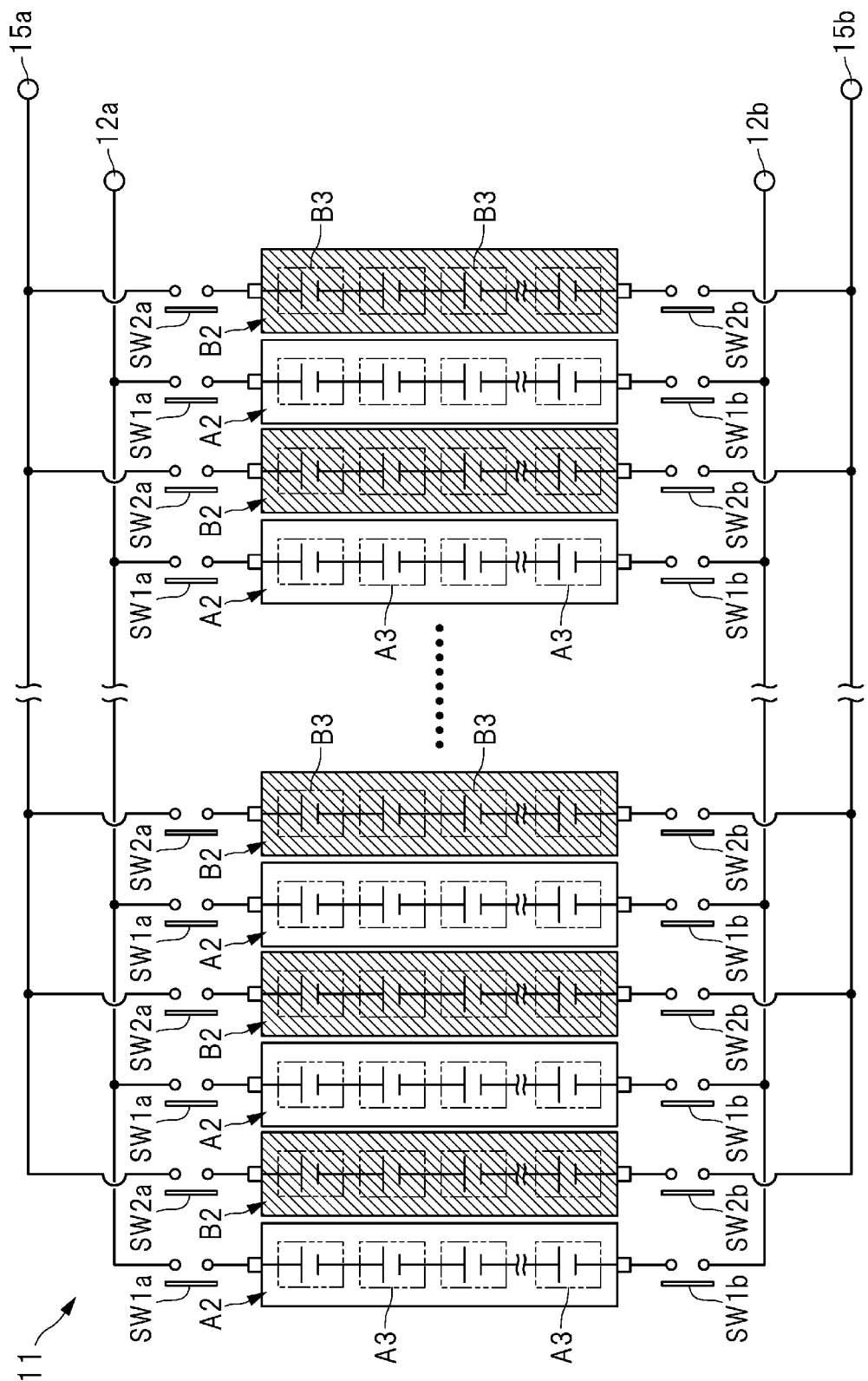
FIG. 2 illustrates an example of the disposition of battery stacks in a battery pack.

FIG. 2 illustrates an example of the disposition of the battery stacks A2 and B2 in the battery pack 11. In FIG. 2, the shaded battery stacks are the battery stacks B2. As illustrated in FIG. 2, the battery stacks A2 and the battery stacks B2 are alternately disposed adjacent to each other. As mentioned above, the battery cells A3 constituting each battery stack A2 are battery cells A3 manufactured as new products, whereas the battery cells B3 constituting each battery stack B2 are battery cells B3 manufactured as recycled products. Therefore, the internal resistance of each battery cell B3 that is a recycled product is higher than the internal resistance of each battery cell A3 that is a new product. That is, in the battery pack 11, the battery stacks A2 with the lower internal resistance and the battery stacks B2 with the higher internal resistance are disposed adjacent to each other.

Control System

Figure 3:
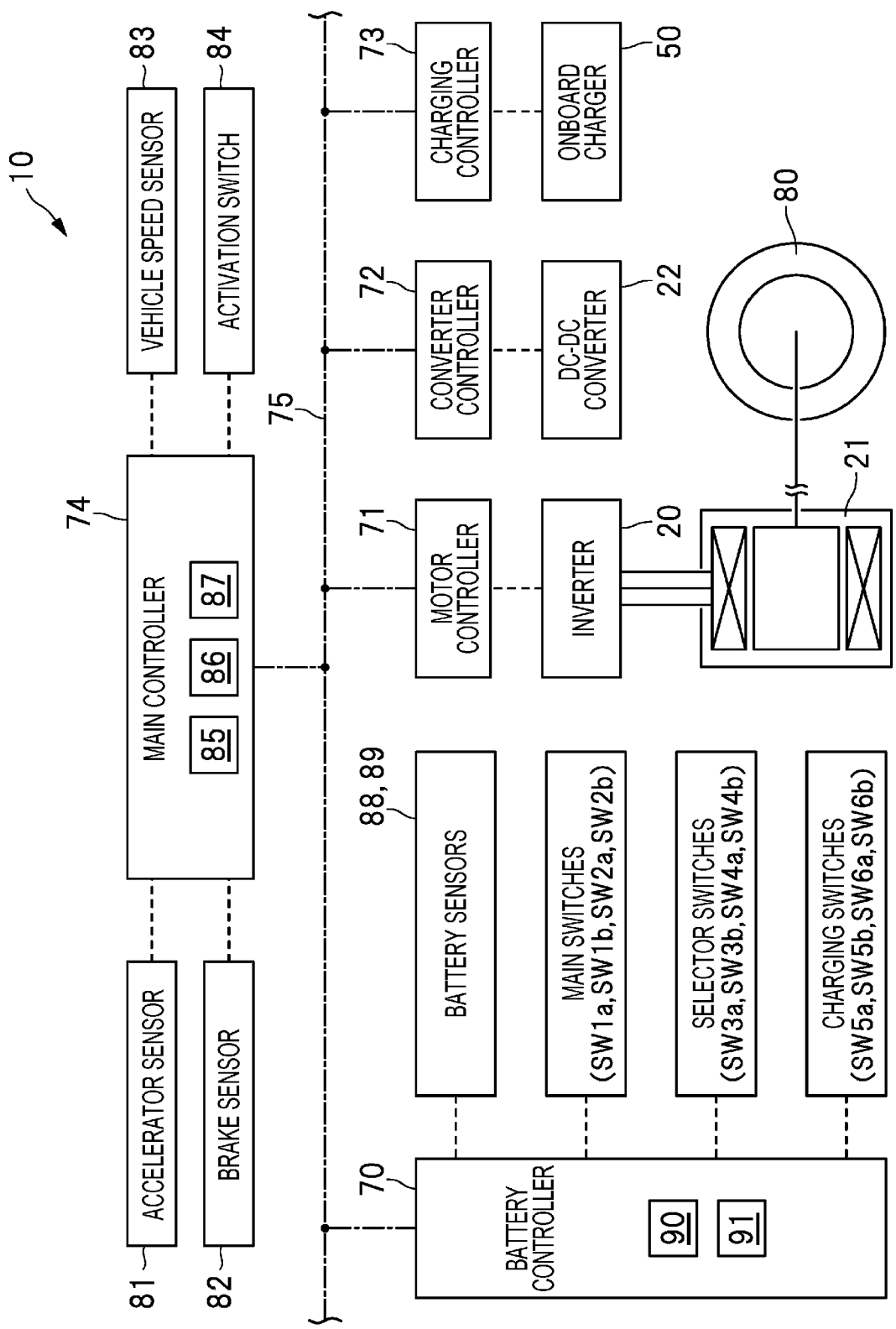
FIG. 3 schematically illustrates an example of a control system equipped in the vehicular power supply device.

FIG. 3 schematically illustrates an example of a control system equipped in the vehicular power supply device 10. As illustrated in FIG. 3, the vehicular power supply device 10 has a plurality of controllers 70 to 74 each constituted of a microcomputer. The controllers 70 to 74 are a battery controller 70 that controls the battery pack 11, a motor controller 71 that controls the motor generator 21 coupled to vehicle wheels 80, a converter controller 72 that controls the converter 22, a charging controller 73 that controls the onboard charger 50, and a main controller 74 that integrally controls the controllers 70 to 73. The controllers 70 to 74 are coupled to one another in a communicable manner via an onboard network 75, such as a controller area network (CAN).

The main controller 74 is coupled to an accelerator sensor 81 that detects the operation status of an accelerator pedal, a brake sensor 82 that detects the operation status of a brake pedal, and a vehicle speed sensor 83 that detects the travel speed of the vehicle. The main controller 74 is also coupled to an activation switch 84 that is to be operated by the driver when a vehicle control system is to be activated and stopped. Furthermore, the main controller 74 is provided with a main-switch operation setting unit 85 that sets a target operating state for each of the main switches SW1*a*, SW1*b*, SW2*a*, and SW2*b*, a selector-switch operation setting unit 86 that sets a target operating position for each of the selector switches SW3*a*, SW3*b*, SW4*a*, and SW4*b*, and a charging-switch operation setting unit 87 that sets a target operating state for each of the charging switches SW5*a*, SW5*b*, SW6*a*, and SW6*b*.

The main-switch operation setting unit 85 of the main controller 74 outputs a control signal according to the target operating states of the main switches SW1*a*, SW1*b*, SW2*a*, and SW2*b* to the battery controller 70, so as to control the main switches SW1*a*, SW1*b*, SW2*a*, and SW2*b* via the battery controller 70. The selector-switch operation setting unit 86 of the main controller 74 outputs a control signal according to the target operating positions of the selector switches SW3*a*, SW3*b*, SW4*a*, and SW4*b* to the battery controller 70, so as to control the selector switches SW3*a*, SW3*b*, SW4*a*, and SW4*b* via the battery controller 70. Furthermore, the charging-switch operation setting unit 87 of the main controller 74 outputs a control signal according to the target operating states of the charging switches SW5*a*, SW5*b*, SW6*a*, and SW6*b* to the battery controller 70, so as to control the charging switches SW5*a*, SW5*b*, SW6*a*, and SW6*b* via the battery controller 70. Accordingly, the main-switch operation setting unit 85, the selector-switch operation setting unit 86, the charging-switch operation setting unit 87, and the battery controller 70 function as a switch controller that controls the various switches SW1*a*, SW1*b*, . . . , SW6*a*, and SW6*b*.

The battery controller 70 is coupled to battery sensors 88 and 89. The battery sensor 88 has a function for detecting, for example, the temperature, the charge-discharge electric current, and the terminal voltage of each battery stack A2. The battery sensor 89 has a function for detecting the temperature, the charge-discharge electric current, and the terminal voltage of each battery stack B2. The battery controller 70 is provided with an SOC calculator 90 that calculates the state of charge (SOC) of each of the battery stacks A2 and B2, as well as an SOH calculator 91 that calculates the state of health (SOH) indicating the state of degradation of each of the battery stacks A2 and B2.

The SOC of each of the battery stacks A2 and B2 is a percentage indicating the amount of stored electricity remaining in the battery stack A2 or B2, and is a percentage of the amount of stored electricity relative to the full charge capacity of the battery stack A2 or B2. That is, the SOC is calculated to be higher with increasing amount of stored electricity in the battery stack A2 or B2, whereas the SOC is calculated to be lower with decreasing amount of stored electricity in the battery stack A2 or B2. The SOC also referred to as a charged state is periodically calculated by the SOC calculator 90 of the battery controller 70 based on the charge-discharge electric current and the terminal voltage of the battery stack A2 or B2.

The SOH of each of the battery stacks A2 and B2 is an indicator indicating the state of degradation of the battery stack A2 or B2. The SOH indicating the state of degradation can be calculated as, for example, a capacity retention rate of the battery stack A2 or B2. That is, in a case where there is no progression in the degradation of the battery stack A2 or B2, the current capacity retention rate is higher than that in the initial state, so that the SOH is calculated to be higher as the battery stack A2 or B2 is in a better condition. In contrast, in a case where there is progression in the degradation of the battery stack A2 or B2, the current capacity retention rate is lower than that in the initial state, so that the SOH is calculated to be lower as the battery stack A2 or B2 degrades.

The SOH of each of the battery stacks A2 and B2 is periodically calculated by the SOH calculator 91 of the battery controller 70 based on the charge-discharge electric current and the terminal voltage of the battery stack A2 or B2. Furthermore, as mentioned above, the battery cells A3 constituting each battery stack A2 are battery cells A3 manufactured as new products, whereas the battery cells B3 constituting each battery stack B2 are battery cells B3 manufactured as recycled products. Therefore, at the time of manufacture of the vehicle, the battery stacks B2 are degraded more than the battery stacks A2, such that the SOH of each battery stack B2 is calculated to be lower than the SOH of each battery stack A2.

Basic Operation Mode

Figure 4:
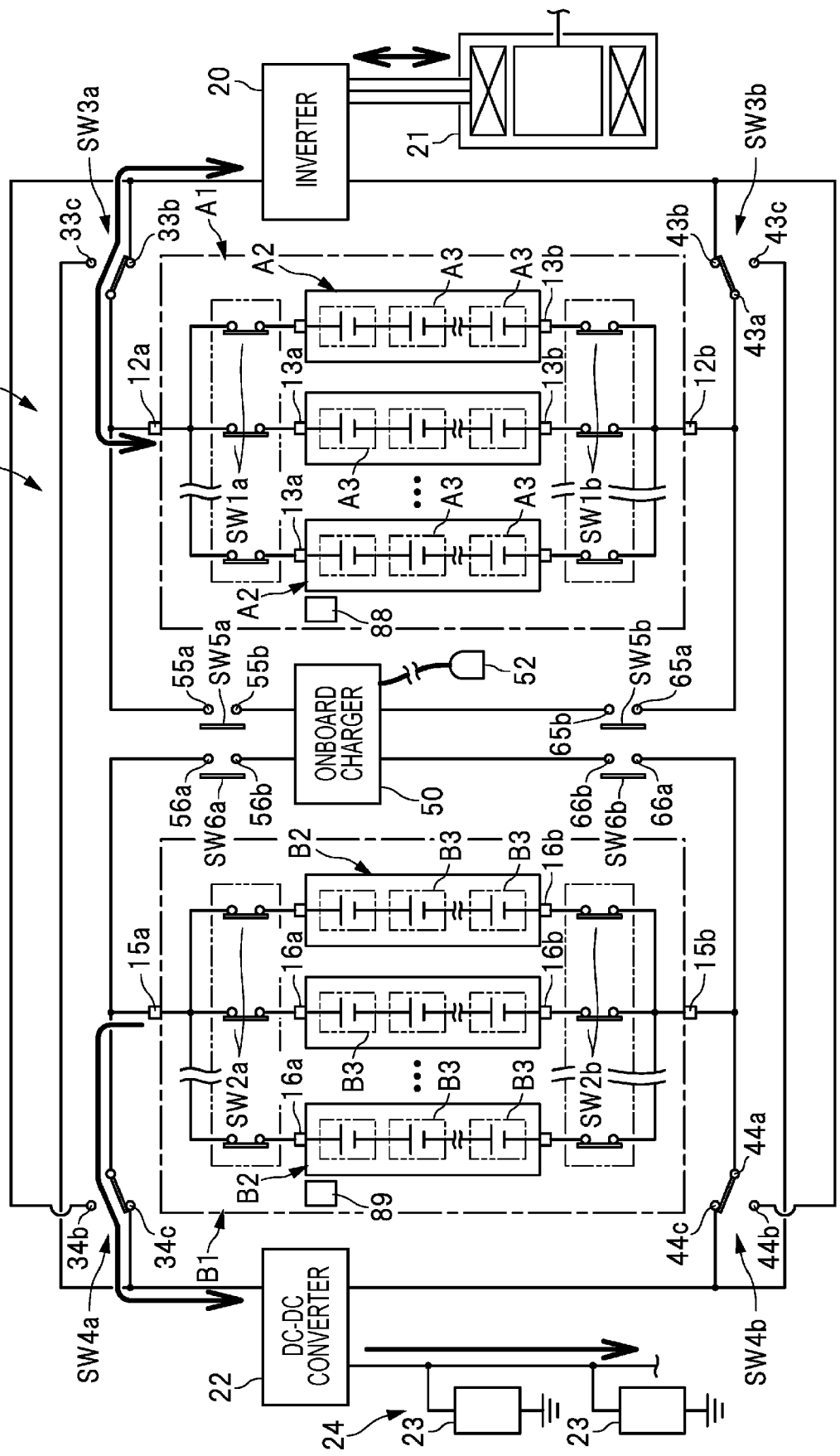
FIG. 4 illustrates an operating state of the battery pack in a basic operation mode.

Next, a basic operation mode of the battery pack 11 will be described. FIG. 4 illustrates an operating state of the battery pack 11 in the basic operation mode. The basic operation mode is to be executed in a case where the vehicle control system is activated in response to an activation operation performed by the driver in a state where the battery stacks A2 are not excessively degraded.

As illustrated in FIG. 4, in the basic operation mode, the main switches SW1a, SW1b, SW2a, and SW2b are switched on, so that the battery stacks A2 and B2 are coupled to the power supply circuit 14 in the battery pack 11. Furthermore, in the basic operation mode, the selector switches SW3a and SW3b are controlled to the inverter positions, so that the stack group A1 constituted of the battery stacks A2 is coupled to the inverter 20. Moreover, in the basic operation mode, the selector switches SW4a and SW4b are controlled to the converter positions, so that the stack group B1 constituted of the battery stacks B2 is coupled to the inverter 20. Accordingly, in the basic operation mode, the stack group A1 is coupled to the inverter 20 having high electric power consumption and high regenerative electric power, whereas the stack group B1 is coupled to the converter 22 having low electric power consumption.

As mentioned above, the battery cells A3 constituting each battery stack A2 are battery cells A3 manufactured as new products, whereas the battery cells B3 constituting each battery stack B2 are battery cells B3 manufactured as recycled products. The battery cells B3 that are recycled products have lower output and lower capacity than the battery cells A3, but can greatly contribute to cost reduction, as compared with the battery cells A3. That is, by coupling the stack group B1 constituted of the battery stacks B2 that are recycled products to the converter 22 having low electric power consumption, the vehicular power supply device 10 can be reduced in cost.

Stack Switching Control

As mentioned above, in the basic operation mode, the stack group A1 equipped with the battery cells A3 that are new products is coupled to the inverter 20, and the stack group B1 equipped with the battery cells B3 that are recycled products is coupled to the converter 22, but the coupling destinations for the stack groups A1 and B1 are to be switched in accordance with the degradation statuses of the battery cells A3 and B3. The following description relates to stack switching control that is to be executed after the vehicle control system is activated by the driver and that is to be performed for switching the coupling destinations for the stack groups A1 and B1 in accordance with the degradation statuses of the battery cells A3 and B3.

Figure 5:
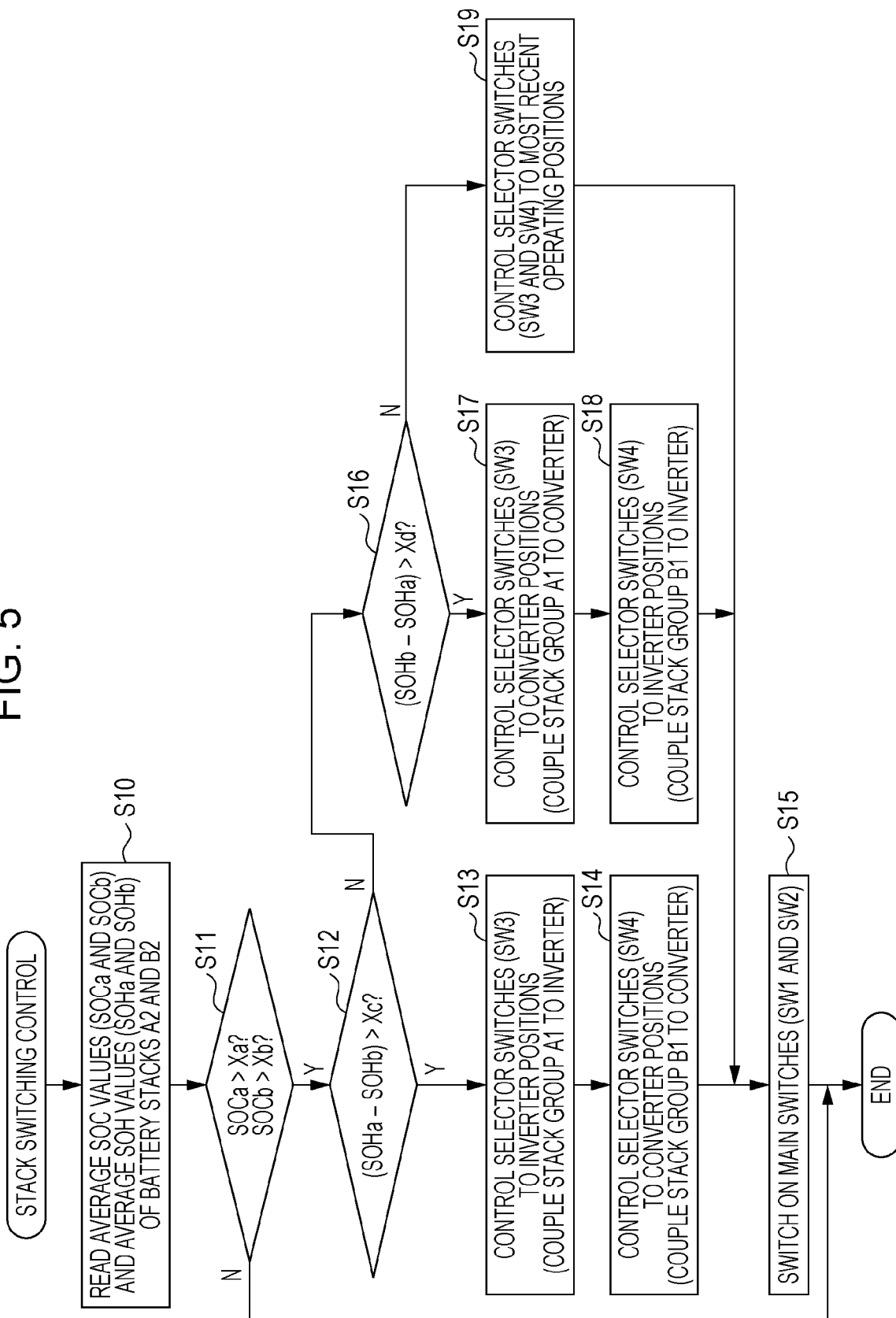
FIG. 5 is a flowchart illustrating an example of a procedure of stack switching control.
Figure 6A:
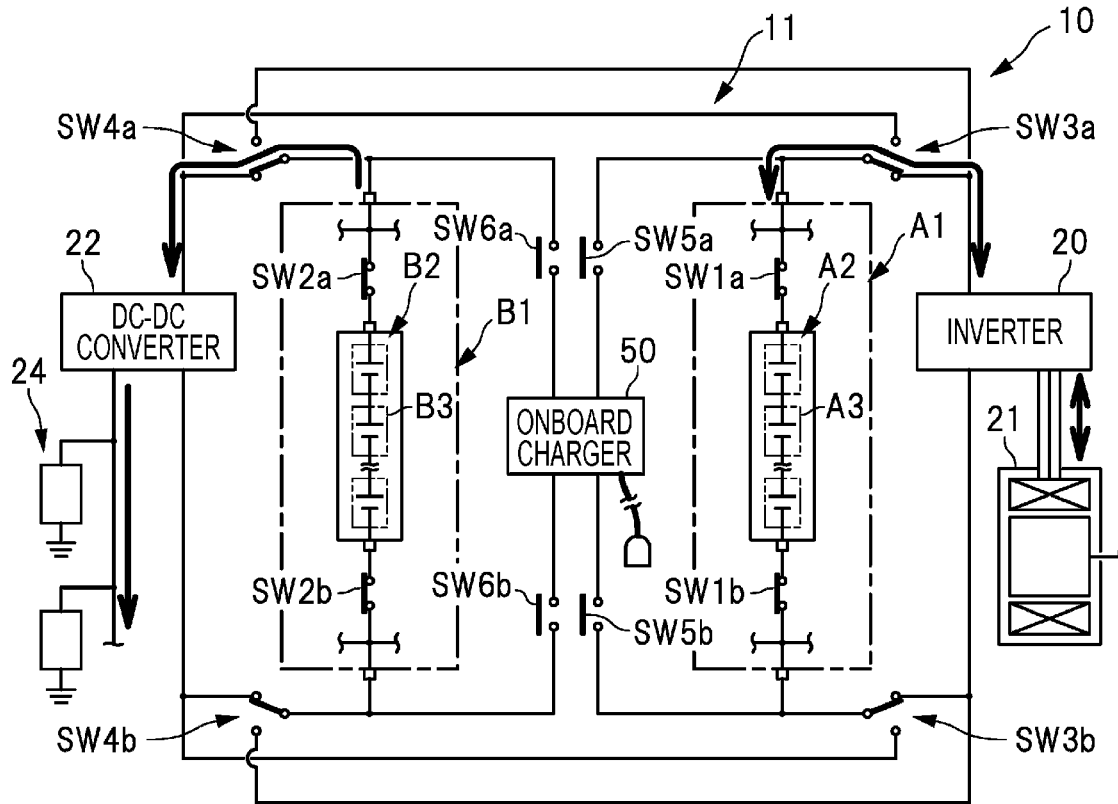
FIG. 6A and FIG. 6B each illustrate an operating state of the battery pack in the stack switching control.
Figure 6B:
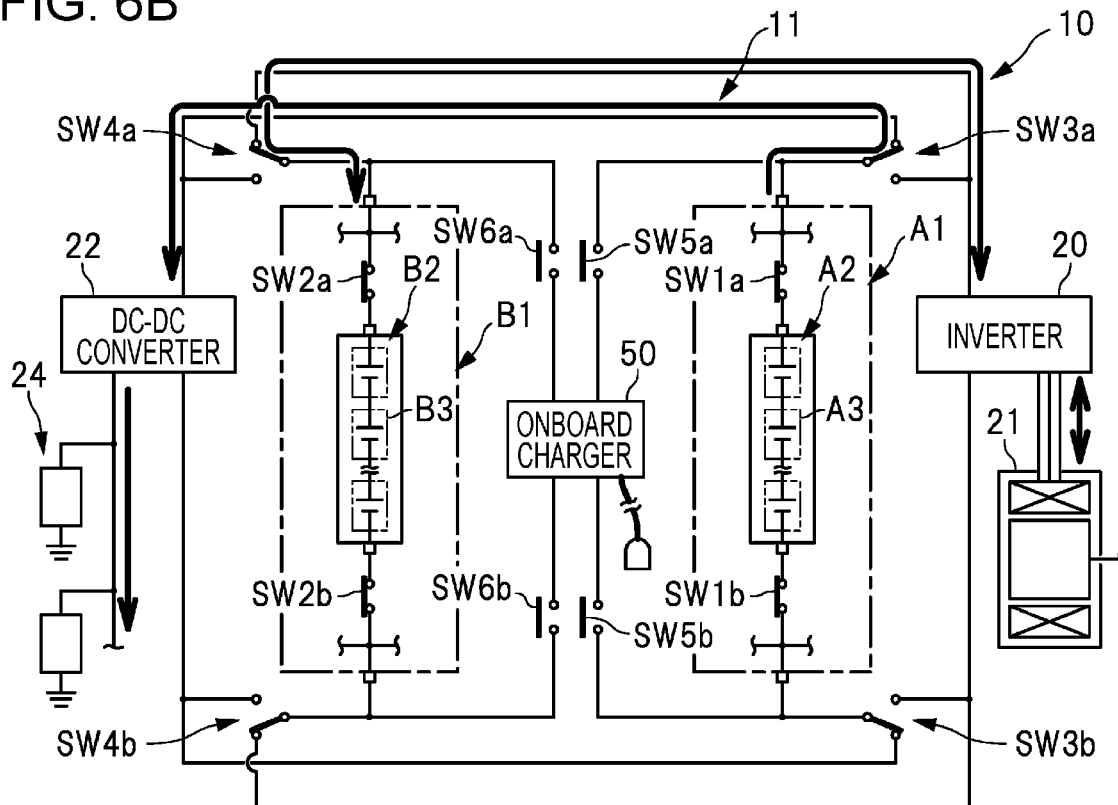

FIG. 5 is a flowchart illustrating an example of a procedure of the stack switching control, and FIG. 6A and FIG. 6B each illustrate an operating state of the battery pack 11 in the stack switching control. In FIG. 6A and FIG. 6B, a charging-discharging state is indicated by using an arrow. As illustrated in FIG. 5, in step S10, average SOC values (SOCa and SOCb) of the battery stacks A2 and B2 are read, and average SOH values (SOHa and SOHb) of the battery stacks A2 and B2 are read. The average SOC value (SOCa) is an average value obtained by dividing the total SOC value of the battery stacks A2 by the number of stacks, and the average SOC value (SOCb) is an average value obtained by dividing the total SOC value of the battery stacks B2 by the number of stacks. The average SOH value (SOHa) is an average value obtained by dividing the total SOH value of the battery stacks A2 by the number of stacks, and the average SOH value (SOHb) is an average value obtained by dividing the total SOH value of the battery stacks B2 by the number of stacks.

In the following description, the "average SOC value (SOCa)" will be referred to as "SOCa", the "average SOC value (SOCb)" will be referred to as "SOCb", the "average SOH value (SOHa)" will be referred to as "SOHa", and the "average SOH value (SOHb)" will be referred to as "SOHb". In the flowcharts from FIG. 5 and onward, the "main switches SW1a and SW1b" will be referred to as "main switches SW1", and the "main switches SW2a and SW2b" will be referred to as "main switches SW2". Furthermore, in the flowcharts from FIG. 5 and onward, the "selector switches SW3a and SW3b" will be referred to as "selector switches SW3", the "selector switches SW4a and SW4b" will be referred to as "selector switches SW4", the "charging switches SW5a and SW5b" will be referred to as "charging switches SW5", and the "charging switches SW6a and SW6b" will be referred to as "charging switches SW6".

As illustrated in FIG. 5, in step S11, it is determined whether the SOCa exceeds a predetermined lower limit value Xa and the SOCb exceeds a predetermined lower limit value Xb. If it is determined in step S11 that the SOCa is lower than or equal to the lower limit value Xa or the SOCb is lower than or equal to the lower limit value Xb, the routine is exited without performing the stack switching control since the SOC of the battery pack 11 is greatly reduced. If the SOC of the battery pack 11 is greatly reduced, a message urging plug-in charging, to be described later, is displayed toward the driver.

If it is determined in step S11 that the SOCa exceeds the lower limit value Xa and the SOCb exceeds the lower limit value Xb, the process proceeds to step S12 where it is determined whether a degradation indicator difference (SOHa−SOHb) between the battery stacks A2 and B2 exceeds a predetermined threshold value Xc. If it is determined in step S12 that the degradation indicator difference (SOHa−SOHb) exceeds the threshold value Xc, that is, if the battery stacks B2 have degraded beyond a predetermined value relative to the battery stacks A2, the process proceeds to step S13 where the selector switches SW3a and SW3b are controlled to the inverter positions so that the stack group A1 constituted of the battery stacks A2 is coupled to the inverter 20. Moreover, the process proceeds to step S14 where the selector switches SW4a and SW4b are controlled to the converter positions so that the stack group B1 constituted of the battery stacks B2 is coupled to the converter 22. Then, the process proceeds to step S15 where the main switches SW1a, SW1b, SW2a, and SW2b are switched on.

In contrast, if it is determined in step S12 that the degradation indicator difference (SOHa−SOHb) is smaller than or equal to the threshold value Xc, the process proceeds to step S16 where it is determined whether a degradation indicator difference (SOHb−SOHa) between the battery stacks B2 and A2 exceeds a predetermined threshold value Xd. If it is determined in step S16 that the degradation indicator difference (SOHb−SOHa) exceeds the threshold value Xd, that is, if the battery stacks A2 have degraded beyond a predetermined value relative to the battery stacks B2, the process proceeds to step S17 where the selector switches SW3a and SW3b are controlled to the converter positions so that the stack group A1 constituted of the battery stacks A2 is coupled to the converter 22. Moreover, the process proceeds to step S18 where the selector switches SW4a and SW4b are controlled to the inverter positions so that the stack group B1 constituted of the battery stacks B2 is coupled to the inverter 20. Then, the process proceeds to step S15 where the main switches SW1a, SW1b, SW2a, and SW2b are switched on.

If it is determined in step S16 that the degradation indicator difference (SOHb−SOHa) is smaller than or equal to the threshold value Xd, the degradation statuses of the battery stacks A2 and B2 are balanced. Thus, the process proceeds to step S19 where the selector switches SW3a, SW3b, SW4a, and SW4b are controlled to the most recent operating positions. That is, the coupling destinations for the stack groups A1 and B1 set at the time of previous activation of the vehicle control system are maintained.

Accordingly, in the stack switching control, the degradation statuses of the battery stacks A2 and B2 are compared. The less-degraded battery stacks, that is, the battery stacks A2 (or B2) with higher output, are coupled to the inverter 20, whereas the degraded battery stacks, that is, the battery stacks B2 (or A2) with lower output, are coupled to the converter 22.

As mentioned above, the battery cells A3 constituting each battery stack A2 are battery cells A3 manufactured as new products, whereas the battery cells B3 constituting each battery stack B2 are battery cells B3 manufactured as recycled products. That is, at the time of manufacture of the vehicle, the battery stacks B2 are degraded more than the battery stacks A2. Therefore, since the battery stacks A2 have not degraded more than the battery stacks B2 if a predetermined period (e.g., several years) has not elapsed from when the vehicle is manufactured, the basic operation mode illustrated in FIG. 4 and FIG. 6A is basically executed. That is, as illustrated in FIG. 6A, if the battery stacks A2 have not degraded more than the battery stacks B2, the stack group A1 constituted of the battery stacks A2 is coupled to the inverter 20, and the stack group B1 constituted of the battery stacks B2 is coupled to the converter 22.

In contrast, if a predetermined period (e.g., several years) has elapsed from when the vehicle is manufactured, the battery stacks A2 may be degraded more than the battery stacks B2, depending on the usage condition of the battery stacks A2. If the battery stacks A2 are degraded more than the battery stacks B2 in this manner, a time-related degradation mode illustrated in FIG. 6B is executed. That is, as illustrated in FIG. 6B, if the battery stacks A2 are degraded more than the battery stacks B2, the stack group A1 constituted of the battery stacks A2 is coupled to the converter 22, and the stack group B1 constituted of the battery stacks B2 is coupled to the inverter 20.

Accordingly, even in a case where the output of the battery stacks A2 is greatly reduced due to time-related degradation, the less-degraded battery stacks B2 are coupled to the inverter 20, so that the motor generator 21 is cause to appropriately operate, thereby ensuring minimum driving performance.

Temperature-Increase Suppression Control

Figure 7:
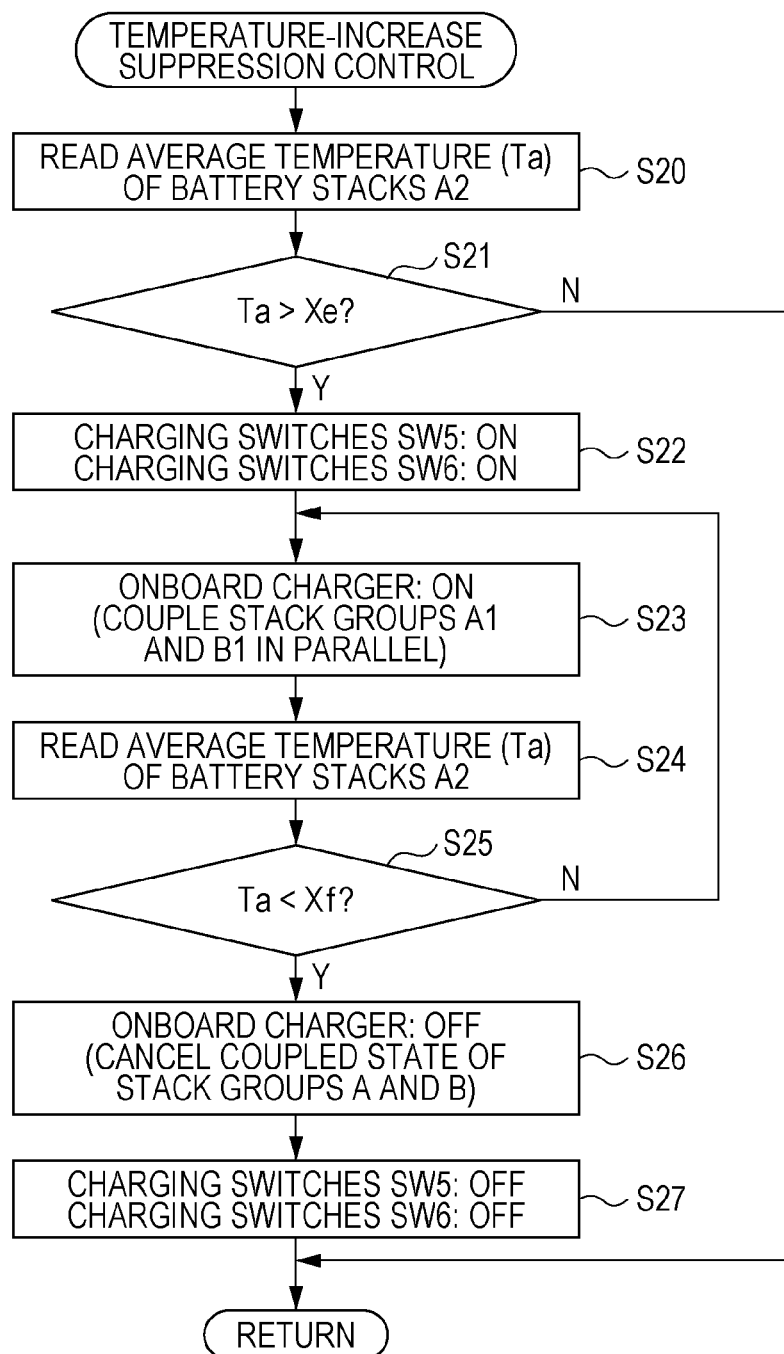
FIG. 7 is a flowchart illustrating an example of a procedure of temperature-increase suppression control.
Figure 8A:
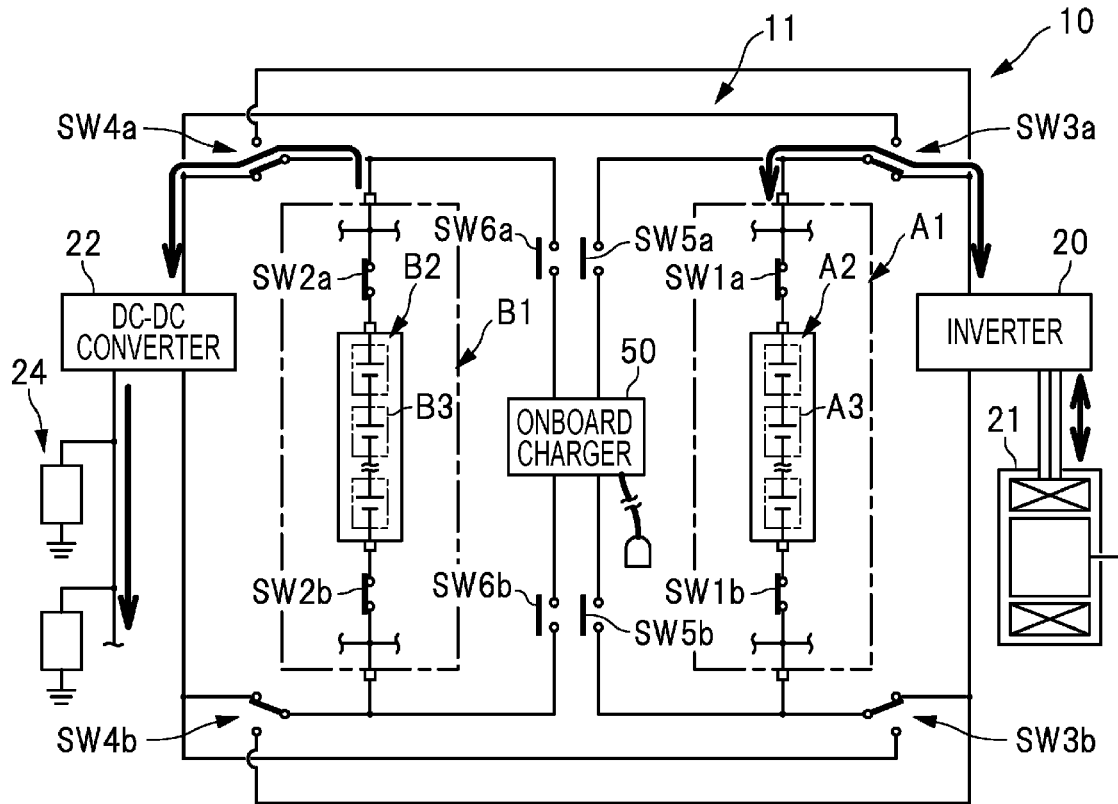
FIG. 8A illustrates an operating state of the battery pack in the basic operation mode.
Figure 8B:
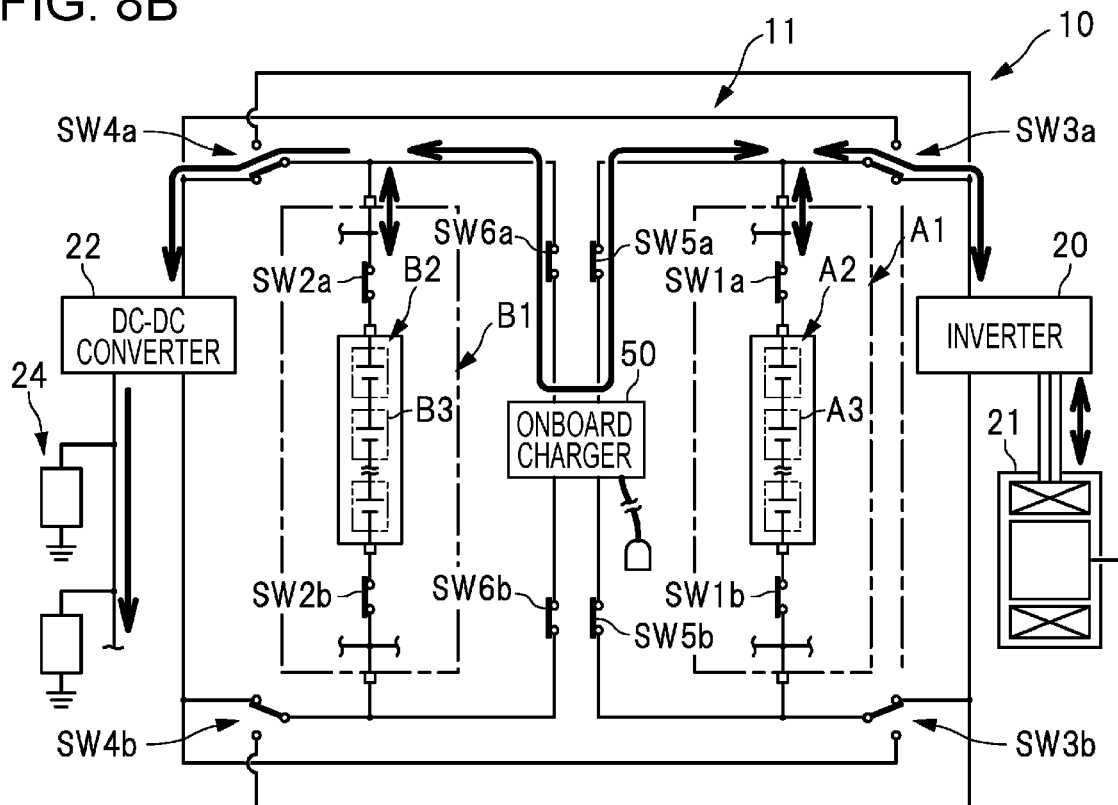
FIG. 8B illustrates an operating state of the battery pack in a temperature-increase suppression mode.

Next, temperature-increase suppression control to be executed in the aforementioned basic operation mode to suppress an excessive temperature increase in the battery stacks A2 will be described. FIG. 7 is a flowchart illustrating an example of a procedure of the temperature-increase suppression control. FIG. 8A illustrates an operating state of the battery pack 11 in the basic operation mode, and FIG. 8B illustrates an operating state of the battery pack 11 in a temperature-increase suppression mode. In FIG. 8A and FIG. 8B, a charging-discharging state is indicated by using an arrow.

As illustrated in FIG. 7, in step S20, an average temperature Ta of the battery stacks A2 is read. The average temperature Ta is an average value obtained by the total temperature value of the battery stacks A2 by the number of stacks. In step S21, it is determined whether the average temperature Ta exceeds a predetermined threshold value Xe. If it is determined in step S21 that the average temperature Ta is lower than or equal to the threshold value Xe, the routine is exited without executing the temperature-increase suppression mode to be described below since the temperature of the battery stacks A2 is appropriate. In contrast, if it is determined in step S21 that the average temperature Ta exceeds the threshold value Xe, the temperature of the battery stacks A2 has increased beyond an appropriate range. Thus, the process proceeds to step S22 where the temperature-increase suppression mode for decreasing the temperature of the battery stacks A2 commences.

In step S22, the charging switches SW5a, SW5b, SW6a, and SW6b are switched on. In step S23, the onboard charger 50 is controlled to an energized state, so that the stack groups A1 and B1 are electrically coupled to each other via the onboard charger 50. That is, as illustrated in FIG. 8B, the temperature-increase suppression mode is executed so that the inverter 20 is electrically coupled to the stack group A1 and also to the stack group B1 via the onboard charger 50. Accordingly, in a case where the electric power consumption and the regenerative electric power of the inverter 20 have increased, both the stack group A1 and the stack group B1 can be charged and discharged. That is, the charging and discharging of the stack group A1 can be suppressed, so that the temperature of the battery stacks A2 constituting the stack group A1 can be decreased.

When the temperature-increase suppression mode is executed in this manner, the process proceeds to step S24 where the average temperature Ta of the battery stacks A2 is read. Then, the process proceeds to step S25 where it is determined whether the average temperature Ta falls below a predetermined threshold value Xf. If it is determined in step S25 that the average temperature Ta is higher than or equal to the threshold value Xf, the temperature of the battery stacks A2 is not sufficiently decreased. Thus, the process returns to step S23 to continue executing the temperature-increase suppression mode. In contrast, if it is determined in step S25 that the average temperature Ta falls below the threshold value Xf, the temperature of the battery stacks A2 is sufficiently decreased, so that the process proceeds to step S26 where the onboard charger 50 is controlled to a stopped state. Then, the process proceeds to step S27 where the charging switches SW5a, SW5b, SW6a, and SW6b are switched off.

Cruising-Distance Extension Control

Figure 9:
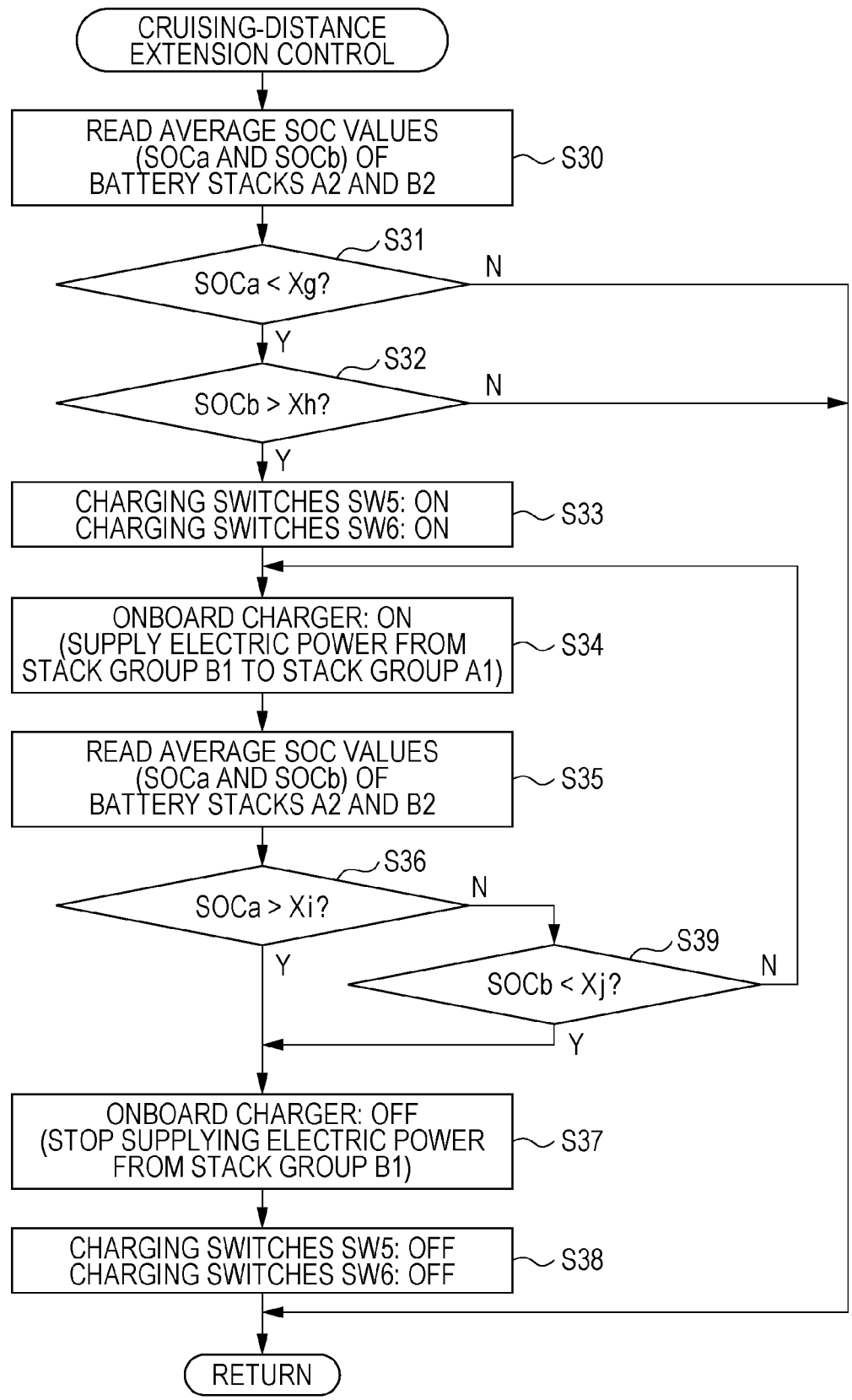
FIG. 9 is a flowchart illustrating an example of a procedure of cruising-distance extension control.
Figure 10A:
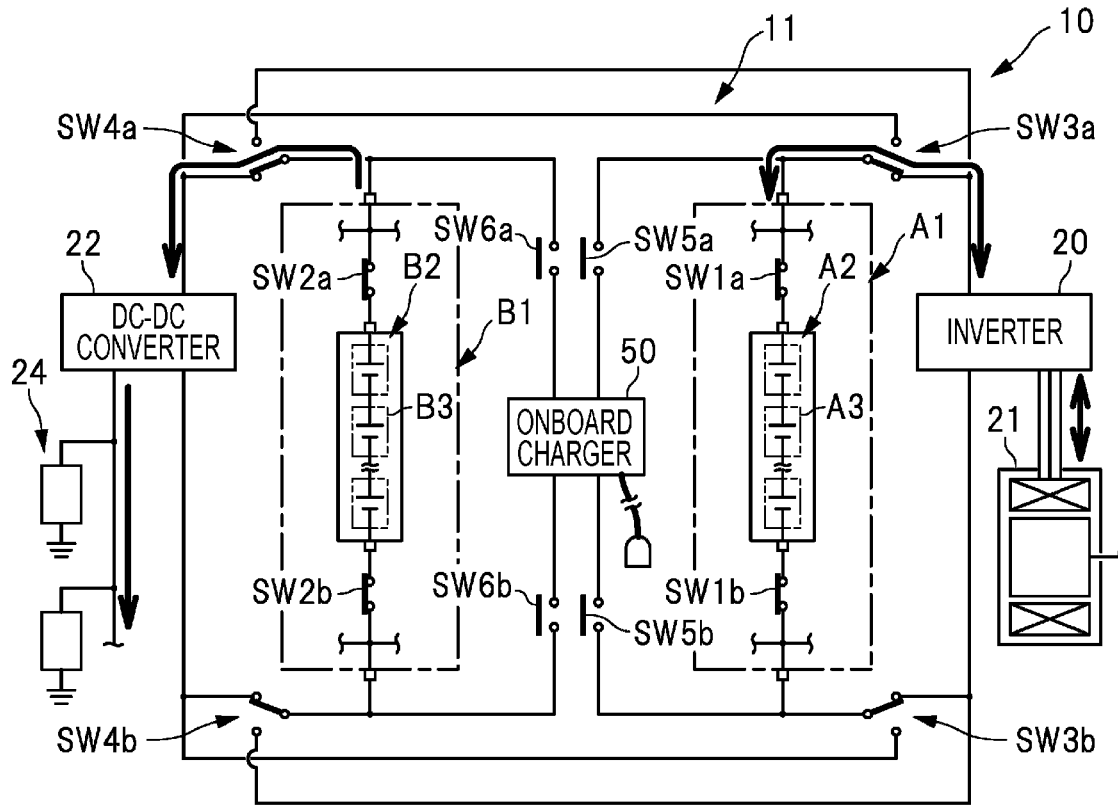
FIG. 10A illustrates an operating state of the battery pack in the basic operation mode.
Figure 10B:
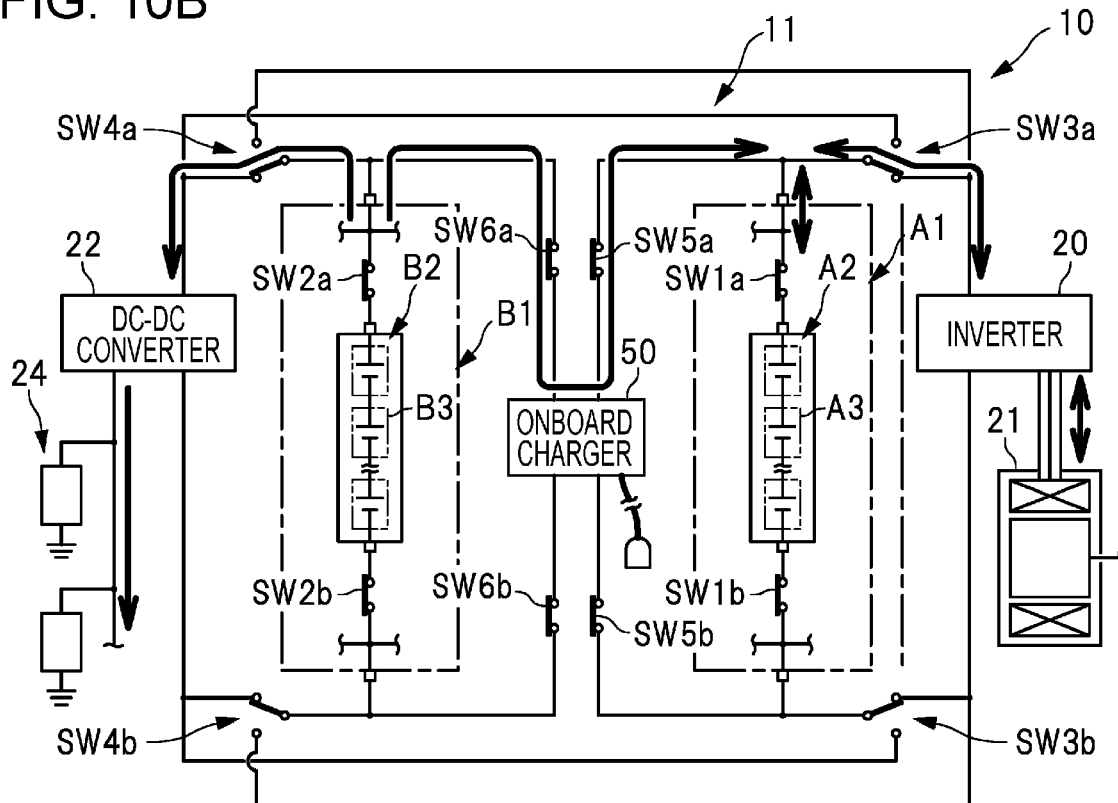
FIG. 10B illustrates an operating state of the battery pack in a distance extension mode.

Next, cruising-distance extension control to be executed in the above-described basic operation mode for supplying electric power from the battery stacks B2 to the battery stacks A2 will be described. FIG. 9 is a flowchart illustrating an example of a procedure of the cruising-distance extension control. FIG. 10A illustrates an operating state of the battery pack 11 in the basic operation mode, and FIG. 10B illustrates an operating state of the battery pack 11 in a distance extension mode. In FIG. 10A and FIG. 10B, a charging-discharging state is indicated by using an arrow.

As illustrated in FIG. 9, in step S30, the SOCa and SOCb of the battery stacks A2 and B2 are read. In step S31, it is determined whether the SOCa falls below a predetermined threshold value Xg. If it is determined in step S31 that the SOCa is higher than or equal to the threshold value Xg, that is, if the amount of stored electricity in the battery stacks A2 is sufficiently ensured, the distance extension mode to be described below is not to be performed. Thus, the routine is exited without executing the distance extension mode. In contrast, if it is determined in step S31 that the SOCa falls below the threshold value Xg, the process proceeds to step S32 where it is determined whether the SOCb exceeds a predetermined threshold value Xh. If it is determined in step S32 that the SOCb is lower than or equal to the threshold value Xh, that is, if the amount of stored electricity in the battery stacks B2 is not sufficiently ensured, it is difficult to execute the distance extension mode. Thus, the routine is exited without executing the distance extension mode.

In contrast, when the process proceeds to step S32 from step S31 and it is determined in step S32 that the SOCb exceeds the threshold value Xh, that is, when the amount of stored electricity in the battery stacks A2 is insufficient and the amount of stored electricity in the battery stacks B2 is sufficiently ensured, the process proceeds to step S33 where the distance extension mode for enhancing the SOCa of the battery stacks A2 commences. In step S33, the charging switches SW5a, SW5b, SW6a, and SW6b are switched on. In step S34, the onboard charger 50 is controlled to an energized state, so that electric power is supplied to the stack group A1 from the stack group B1 via the onboard charger 50. That is, as illustrated in FIG. 10B, the distance extension mode is executed so that electric power can be supplied to the stack group A1 from the stack group B1, whereby the SOCa of the battery stacks A2 constituting the stack group A1 can be enhanced.

Subsequently, in step S35, the SOCa and SOCb of the battery stacks A2 and B2 are read. In step S36, it is determined whether the SOCa exceeds a predetermined threshold value Xi. If it is determined in step S36 that the SOCa exceeds the threshold value Xi, the amount of stored electricity in the battery stacks A2 is sufficiently restored. Thus, the process proceeds to step S37 where the onboard charger 50 is controlled to a stopped state. The process then proceeds to step S38 where the charging switches SW5a, SW5b, SW6a, and SW6b are switched off. By executing the distance extension mode in this manner, electric power can be supplied from the battery stacks B2 to the battery stacks A2, so that the amount of stored electricity in the battery pack 11 can be effectively utilized to supply electric power to the motor generator 21, whereby the cruising distance of the vehicle can be extended.

In contrast, if it is determined in step S36 that the SOCa is lower than or equal to the threshold value Xi, the process proceeds to step S39 where it is determined whether the SOCb falls below a predetermined threshold value Xj. If it is determined in step S39 that the SOCb falls below the threshold value Xj, the amount of stored electricity in the battery stacks B2 has decreased and it is difficult to continue with the distance extension mode. Thus, the process proceeds to step S37 where the onboard charger 50 is controlled to a stopped state. The process then proceeds to step S38 where the charging switches SW5a, SW5b, SW6a, and SW6b are switched off. In contrast, if it is determined in step S39 that the SOCb is higher than or equal to the threshold value Xj, the amount of stored electricity in the battery stacks B2 is ensured. Thus, the process returns to step S34 to continue executing the distance extension mode.

Plug-In Charging Control

Figure 11:
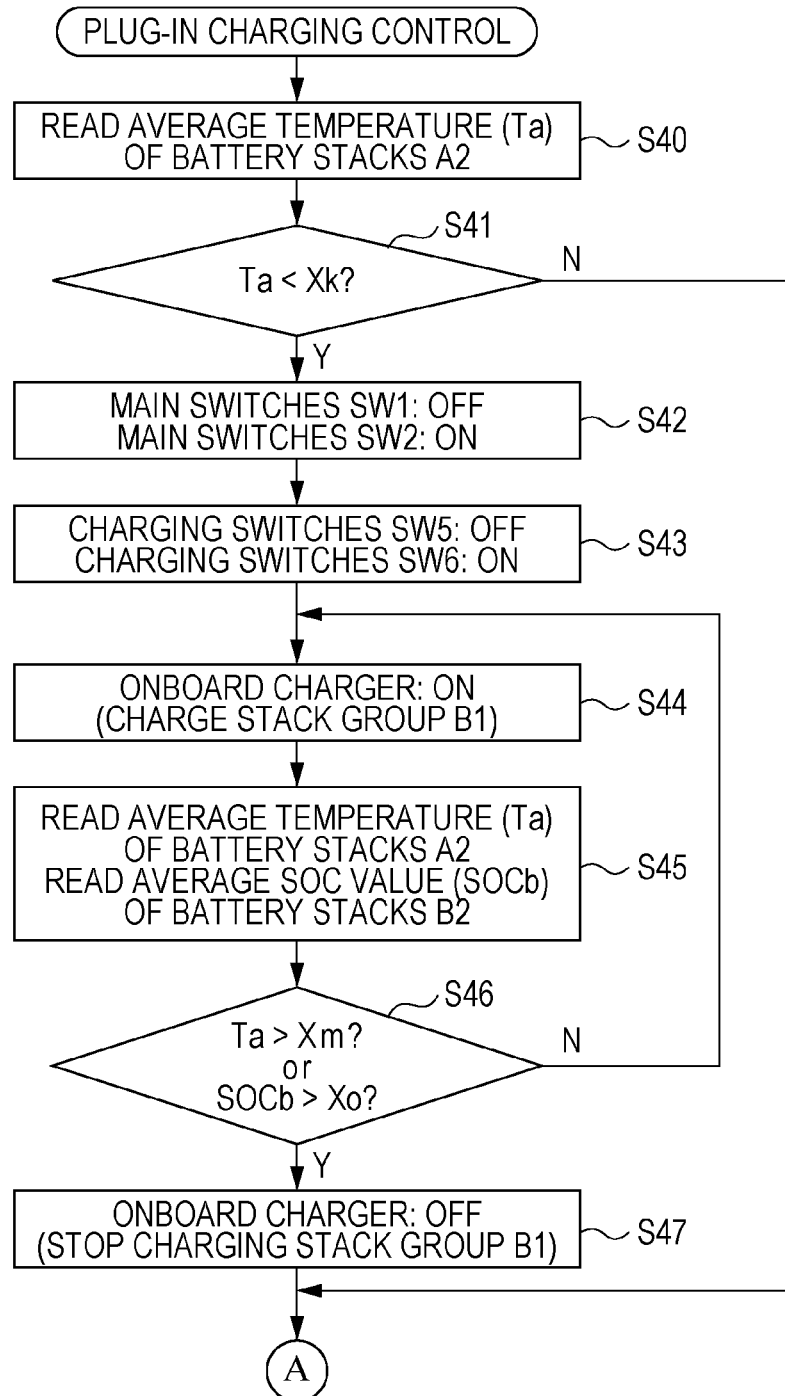
FIG. 11 is a flowchart illustrating an example of a procedure of plug-in charging control.
Figure 12:
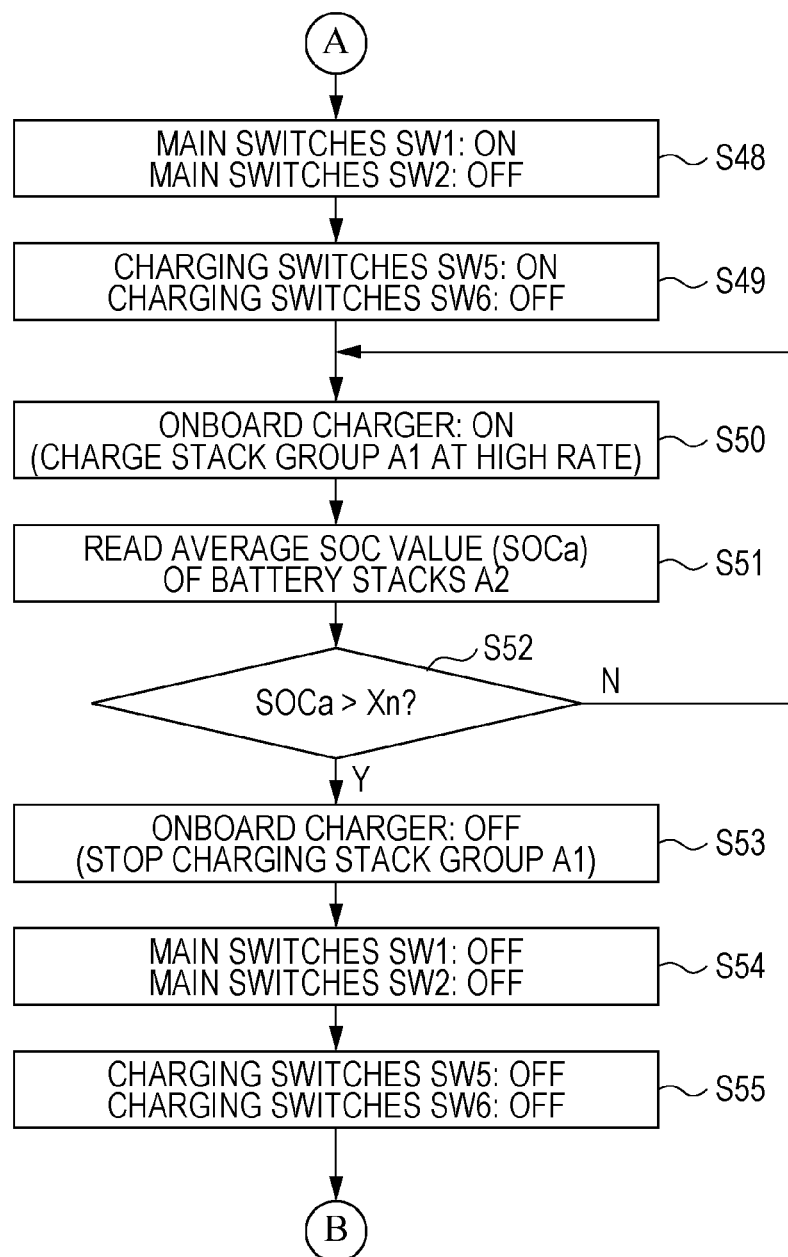
FIG. 12 is a flowchart illustrating the example of the procedure of the plug-in charging control.
Figure 13:
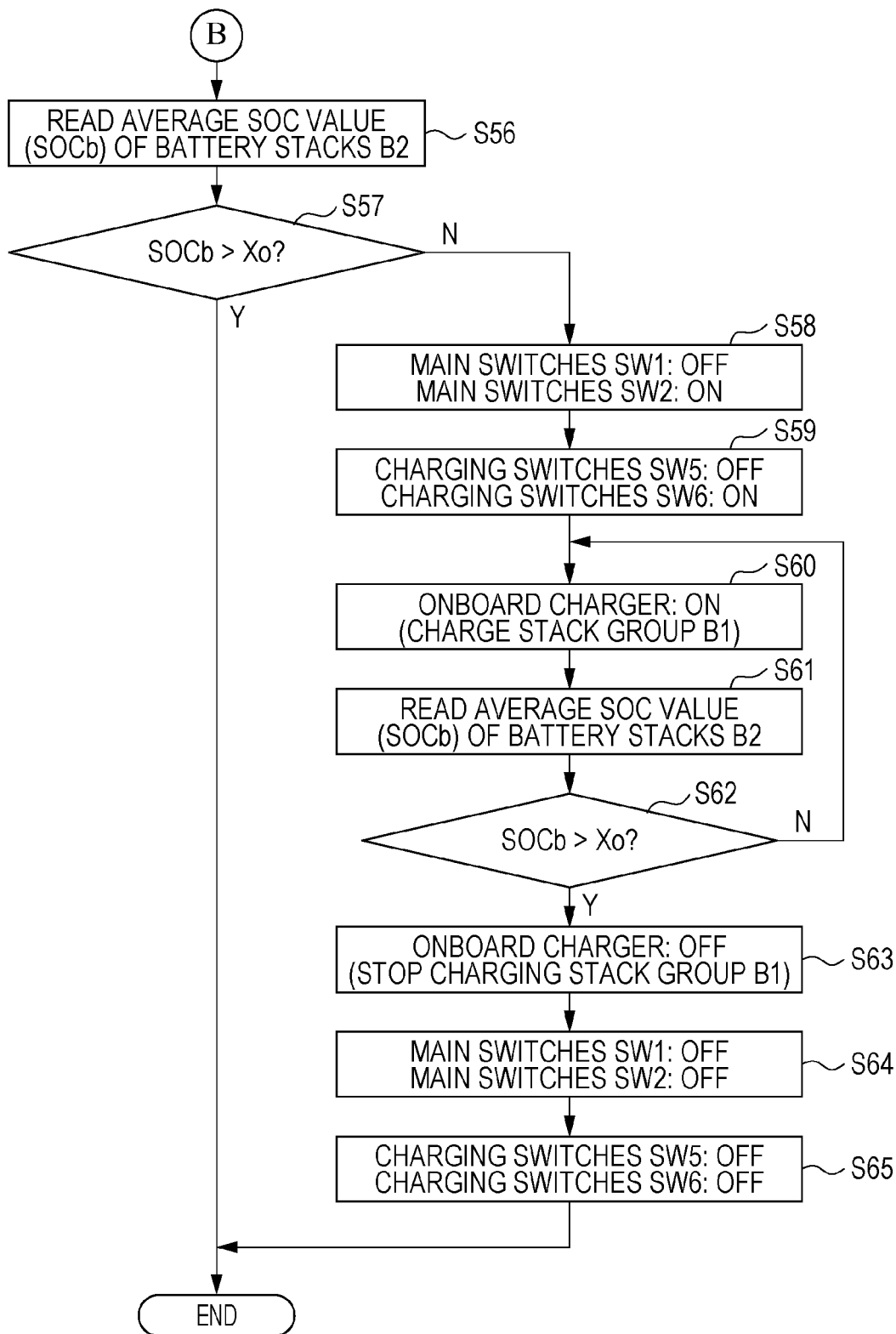
FIG. 13 is a flowchart illustrating the example of the procedure of the plug-in charging control.
Figure 14A:
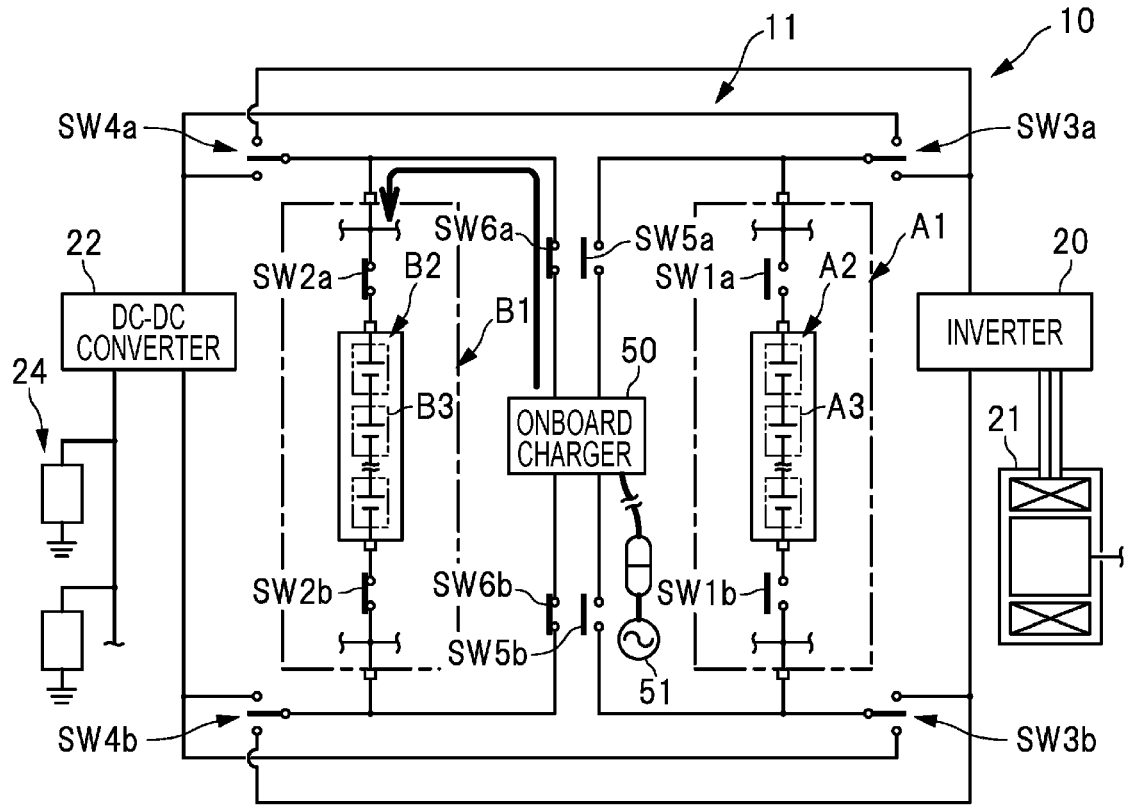
FIG. 14A and FIG. 14B each illustrate a state where a stack group is charged by an external power source.
Figure 14B:
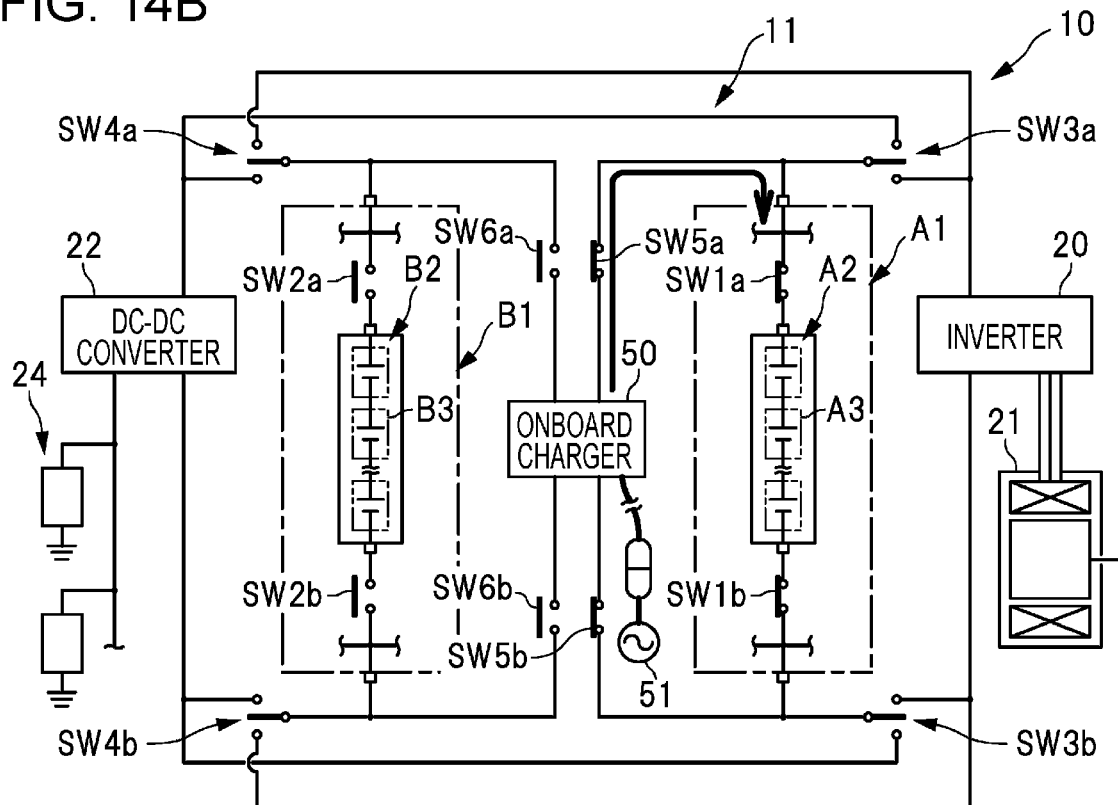

The following description relates to plug-in charging control for charging (referred to as "plug-in charging" hereinafter) the battery pack 11 using the onboard charger 50 by coupling the charging plug 53 of the external power source 51 to the inlet 52 of the onboard charger 50. FIG. 11 to FIG. 13 are flowcharts illustrating an example of a procedure of the plug-in charging control. In FIG. 11 to FIG. 13, the flowcharts are coupled to each other at sections indicated by reference signs A and B. FIG. 14A illustrates a state where the stack group B1 is charged by the external power source 51, and FIG. 14B illustrates a state where the stack group A1 is charged by the external power source 51. In FIG. 14A and FIG. 14B, a charging state is indicated by using an arrow.

As illustrated in FIG. 11, in step S40, the average temperature Ta of the battery stacks A2 is read. In step S41, it is determined whether the average temperature Ta falls below a predetermined threshold value Xk. If it is determined in step S41 that the average temperature Ta falls below the threshold value Xk, the process proceeds to step S42 where the battery stacks B2 are plug-in charged to warm the battery stacks A2. If it is determined in step S41 that the average temperature Ta is higher than or equal to the threshold value Xk, the process proceeds to step S48 to be described later without commencing the plug-in charging of the battery stacks B2.

In order to start plug-in charging the battery stacks B2, the main switches SW1a and SW1b are switched off and the main switches SW2a and SW2b are switched on in step S42. Then, in step S43, the charging switches SW5a and SW5b are switched off, and the charging switches SW6a and SW6b are switched on. When the stack group B1 is coupled to the onboard charger 50 in this manner, the process proceeds to step S44 where the onboard charger 50 is controlled to an energized state for charging the stack group B1, so that electric power is supplied to the stack group B1 from the external power source 51 via the onboard charger 50. That is, as illustrated in FIG. 14A, the battery stacks B2 are plug-in charged before the battery stacks A2 are plug-in charged, so that the battery stacks A2 can be warmed with heat generated from the battery stacks B2. By warming the battery stacks A2 in this manner, the internal resistance of the battery stacks A2 can be reduced, thereby enhancing the charging efficiency.

As mentioned above, the battery cells A3 constituting each battery stack A2 are battery cells A3 manufactured as new products, whereas the battery cells B3 constituting each battery stack B2 are battery cells B3 manufactured as recycled products. Therefore, the internal resistance of the battery cells B3 that are recycled products is higher than the internal resistance of the battery cells A3 that are new products. That is, by plug-in charging the battery cells B3 that generate heat more easily due to the higher internal resistance, the battery stacks A2 can be actively warmed. In addition, since the battery stacks A2 and B2 are adjacent to each other, the battery stacks A2 can be actively warmed by the heat of the battery stacks B2.

When the battery stacks A2 are warmed by the battery stacks B2 in this manner, the process proceeds to step S45 where the average temperature Ta of the battery stacks A2 is read and the SOCb of the battery stacks B2 is read. Then, the process proceeds to step S46 where it is determined whether the average temperature Ta exceeds a predetermined threshold value Xm, and whether the SOCb exceeds a predetermined target charging value Xo. If it is determined in step S46 that the average temperature Ta is lower than or equal to the threshold value Xm and that the SOCb is lower than or equal to the target charging value Xo, the process returns to step S44 to continue plug-in charging the battery stacks B2. That is, if the battery stacks A2 are not sufficiently warm and the battery stacks B2 are still plug-in chargeable, the process returns to step S44 to continue plug-in charging the battery stacks B2.

In contrast, if it is determined in step S46 that the average temperature Ta exceeds the threshold value Xm or that the SOCb exceeds the target charging value Xo, the process proceeds to step S47 where the onboard charger 50 is controlled to a stopped state to stop plug-in charging the stack group B1. That is, when the battery stacks A2 are sufficiently warm and it is difficult to plug-in charge the battery stacks B2, the process proceeds to step S47 where the onboard charger 50 is controlled to a stopped state to stop plug-in charging the stack group B1. Then, in order to start plug-in charging the stack group A1, the main switches SW1a and SW1b are switched on and the main switches SW2a and SW2b are switched off in step S48, as illustrated in FIG. 12. Then, in step S49, the charging switches SW5a and SW5b are switched on, and the charging switches SW6a and SW6b are switched off.

When the stack group A1 is coupled to the onboard charger 50 in this manner, the process proceeds to step S50 where the onboard charger 50 is controlled to an energized state for charging the stack group A1, so that electric power is supplied to the stack group A1 from the external power source 51 via the onboard charger 50. Furthermore, in a case where the stack group A1 is to be plug-in charged in step S50, the target charging power is set to a larger value than in the case where the stack group B1 is to be plug-in charged in step S44 described above. That is, as illustrated in FIG. 14B, when the stack group A1 is to be plug-in charged, the battery stacks A2 are in a warmed state such that the battery stacks A2 have low internal resistance and high charging efficiency, thereby executing high-rate charging in which the charging electric power is increased and the battery stacks A2 are quickly charged.

When the plug-in charging of the stack group A1 commences in this manner, the process proceeds to step S51 where the SOCa of the battery stacks A2 is read. Then, the process proceeds to step S52 where it is determined whether the SOCa exceeds a predetermined target charging value Xn. If it is determined in step S52 that the SOCa is lower than or equal to the target charging value Xn, that is, if the battery stacks A2 are not completely plug-in charged yet, the process returns to step S50 to continue plug-in charging the battery stacks A2.

In contrast, if it is determined in step S52 that the SOCa exceeds the target charging value Xn, the process proceeds to step S53 where the onboard charger 50 is controlled to a stopped state to stop plug-in charging the battery stacks A2. Subsequently, the process proceeds to step S54 where the main switches SW1a, SW1b, SW2a, and SW2b are switched off. The process then proceeds to step S55 where the charging switches SW5a, SW5b, SW6a, and SW6b are switched off.

When the stack group A1 is isolated from the onboard charger 50 in this manner, the process proceeds to step S56 where the SOCb of the battery stacks B2 is read, as illustrated in FIG. 13. Then, the process proceeds to step S57 where it is determined whether the SOCb exceeds the predetermined target charging value Xo. If the SOCb exceeds the target charging value Xo in step S57, the battery stacks B2 are not to be plug-in charged any further. Thus, the routine is exited without executing plug-in charging.

In contrast, if it is determined in step S57 that the SOCb is lower than or equal to the target charging value Xo, that is, if the battery stacks B2 are not completely plug-in charged yet, the process proceeds to step S58 where the main switches SW1a and SW1b are switched off and the main switches SW2a and SW2b are switched on. Subsequently, in step S59, the charging switches SW5a and SW5b are switched off, and the charging switches SW6a and SW6b are switched on.

When the stack group B1 is coupled to the onboard charger 50 in this manner, the process proceeds to step S60 where the onboard charger 50 is controlled to an energized state for charging the stack group B1, so that electric power is supplied to the stack group B1 from the external power source 51 via the onboard charger 50. Subsequently, the process proceeds to step S61 where the SOCb of the battery stacks B2 is read. The process then proceeds to step S62 where it is determined whether the SOCb exceeds the target charging value Xo. If it is determined in step S62 that the SOCb is lower than or equal to the target charging value Xo, that is, if the battery stacks B2 are not completely plug-in charged yet, the process returns to step S60 to continue plug-in charging the battery stacks B2.

In contrast, if it is determined in step S62 that the SOCb exceeds the target charging value Xo, that is, if the battery stacks B2 are sufficiently charged, the process proceeds to step S63 where the onboard charger 50 is controlled to a stopped state to stop plug-in charging the battery stacks B2. Subsequently, the process proceeds to step S64 where the main switches SW1a, SW1b, SW2a, and SW2b are switched off. The process then proceeds to step S65 where the charging switches SW5a, SW5b, SW6a, and SW6b are switched off.

Automatic Supplementary Charging Control

The following description relates to automatic supplementary charging control in which the battery stacks A2 are charged by the battery stacks B2 when the vehicle is in a stopped state. A vehicle stopped state during which the automatic supplementary charging control is to be executed corresponds to a state where the vehicle is stopped when the activation switch 84 serving as a power switch is turned off. That is, a vehicle stopped state during which the automatic supplementary charging control is to be executed is a state where a vehicle travel control system is aborted and the vehicle is continuously stopped until the activation switch 84 is turned on again.

Figure 15:
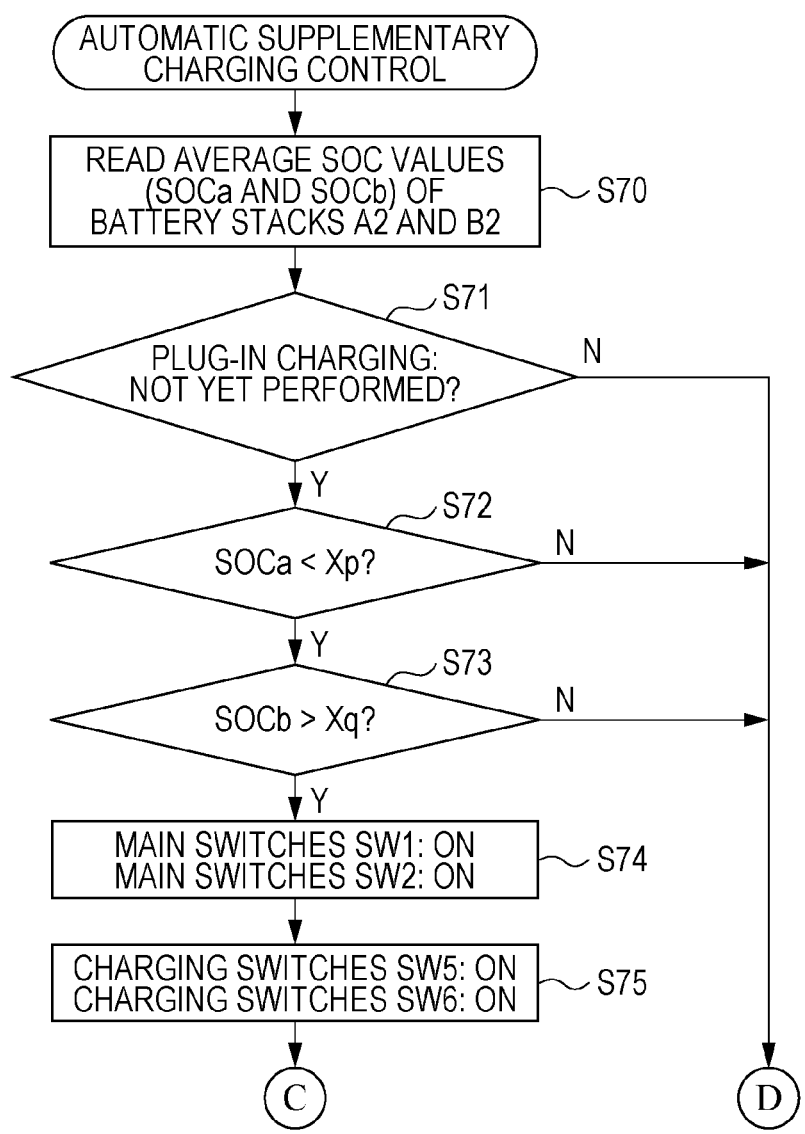
FIG. 15 is a flowchart illustrating an example of a procedure of automatic supplementary charging control.
Figure 16:
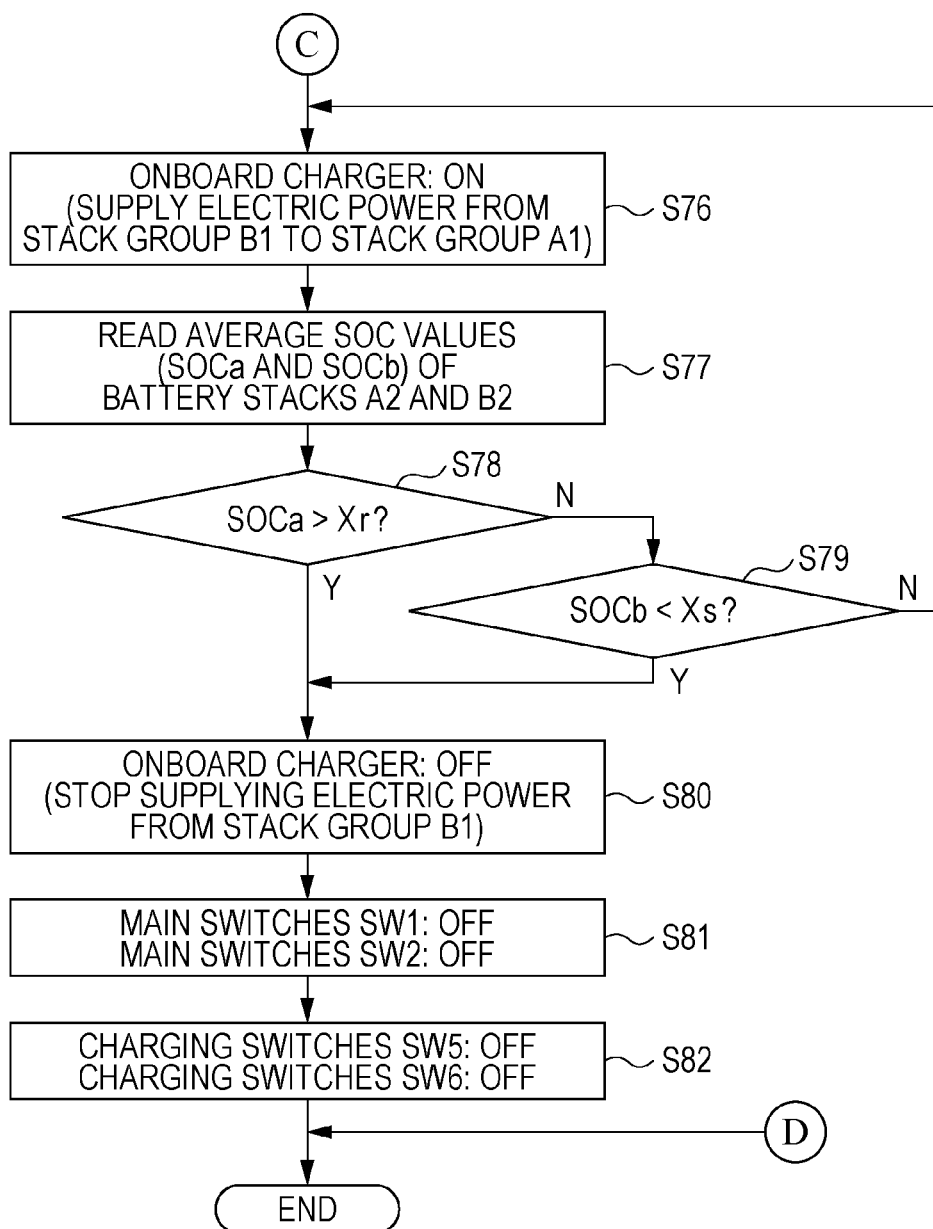
FIG. 16 is a flowchart illustrating the example of the procedure of the automatic supplementary charging control.
Figure 17A:
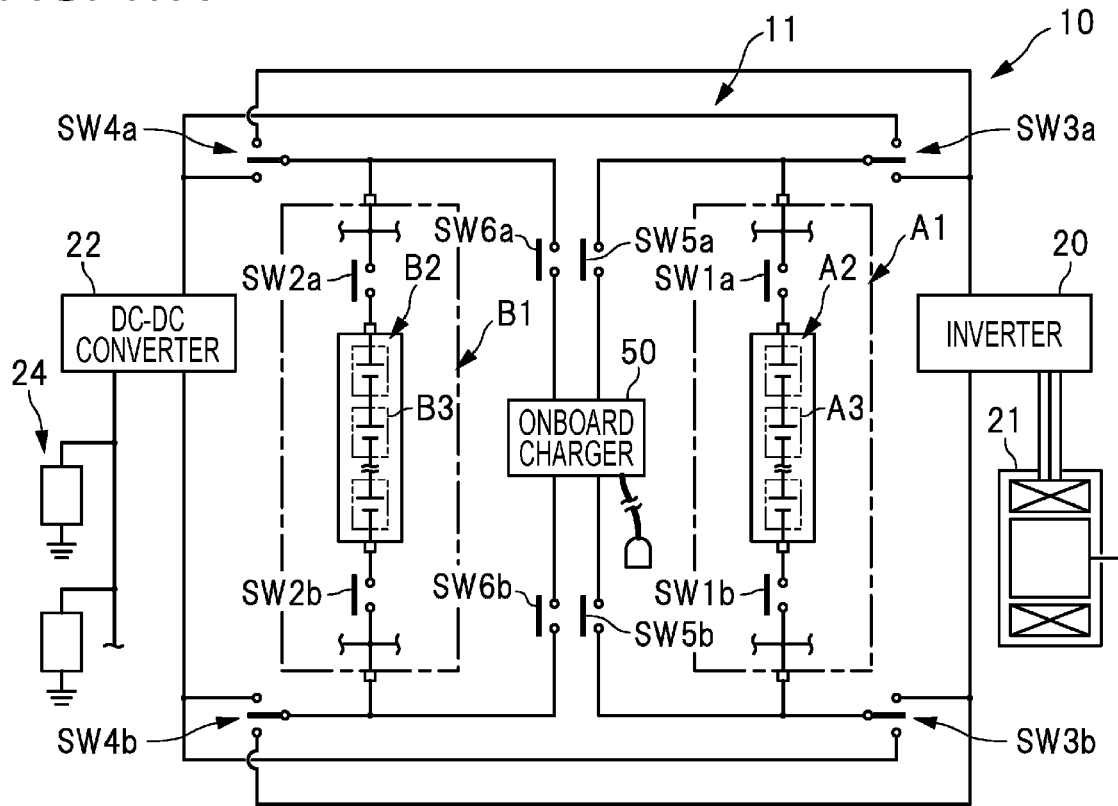
FIG. 17A illustrates an operating state of the battery pack after the vehicle has stopped.
Figure 17B:
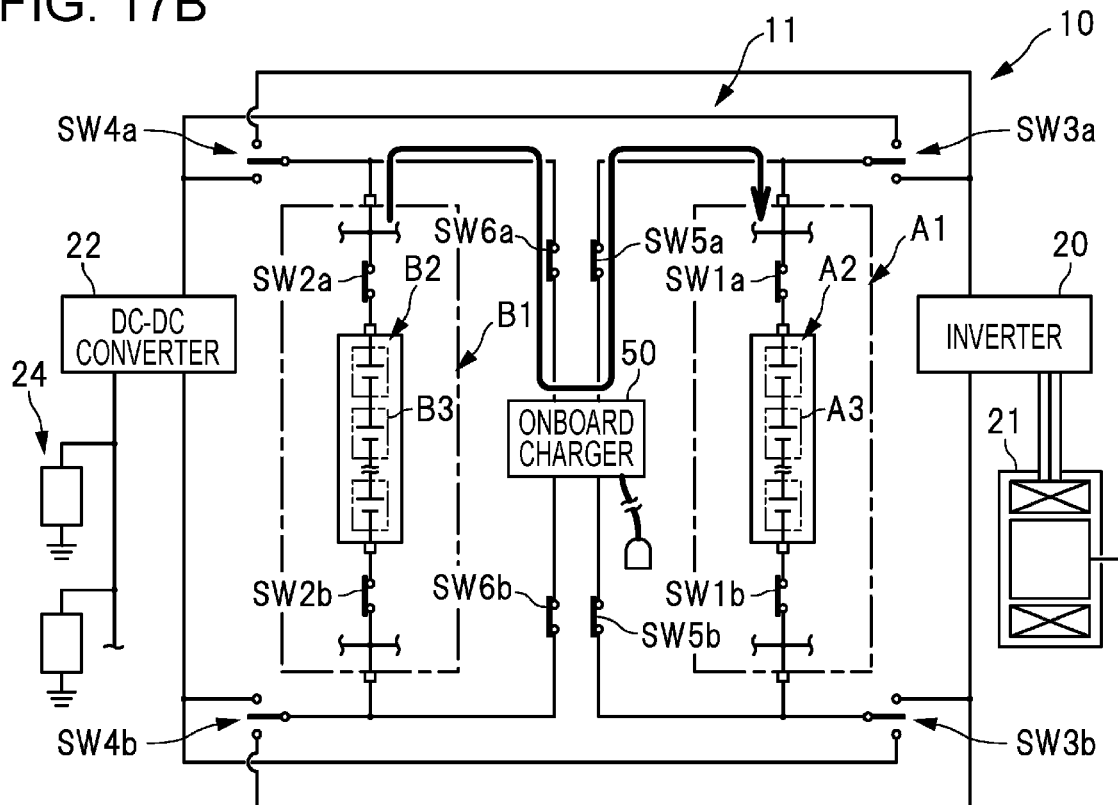
FIG. 17B illustrates an operating state of the battery pack in an automatic supplementary charging mode.

FIG. 15 and FIG. 16 are flowcharts illustrating an example of a procedure of the automatic supplementary charging control. In FIG. 15 and FIG. 16, the flowcharts are coupled to each other at sections indicated by reference signs C and D. FIG. 17A illustrates an operating state of the battery pack 11 after the vehicle has stopped, and FIG. 17B illustrates an operating state of the battery pack 11 in an automatic supplementary charging mode. In FIG. 17A and FIG. 17B, a charging-discharging state is indicated by using an arrow.

As illustrated in FIG. 15, in step S70, the SOCa and SOCb of the battery stacks A2 and B2 are read. Subsequently, the process proceeds to step S71 where it is determined whether plug-in charging using the external power source 51 has not been performed yet. In step S72, it is determined whether the SOCa falls below a predetermined threshold value Xp. In step S73, it is determined whether the SOCb exceeds a predetermined threshold value Xq. If the determination result obtained in step S71 indicates that plug-in charging is being performed, the determination result obtained in step S72 indicates that the SOCa is higher than or equal to the threshold value Xp, or the determination result obtained in step S73 indicates that the SOCb is lower than or equal to the threshold value Xq, the routine is exited without executing the automatic supplementary charging mode to be described below, as illustrated in FIG. 16. That is, in a case where plug-in charging is being performed, the amount of stored electricity in the battery stacks A2 is sufficiently ensured, or the amount of stored electricity in the battery stacks B2 is not sufficiently ensured, the routine is exited without executing the automatic supplementary charging mode.

As illustrated in FIG. 15, in a case where the determination results obtained in step S71 to step S73 indicate that plug-in charging has not been performed yet, the SOCa falls below the threshold value Xp, and the SOCb exceeds the threshold value Xq, the process proceeds to step S74 where the automatic supplementary charging mode commences. In step S74, the main switches SW1a, SW1b, SW2a, and SW2b are switched on. In step S75, the charging switches SW5a, SW5b, SW6a, and SW6b are switched on.

When the stack groups A1 and B1 are coupled to the onboard charger 50 in this manner, the process proceeds to step S76 where the onboard charger 50 is controlled to an operating state so that electric power is supplied to the stack group A1 from the stack group B1 via the onboard charger 50, as illustrated in FIG. 16. That is, as illustrated in FIG. 17B, the automatic supplementary charging mode is executed so that the battery stacks A2 can be charged using the battery stacks B2 while the vehicle is stopped, so that the amount of stored electricity in the battery stacks A2 can be increased, thereby ensuring minimum driving performance immediately after subsequent boarding.

When the charging of the stack group A1 commences in accordance with the automatic supplementary charging mode, the process proceeds to step S77 where the SOCa and SOCb of the battery stacks A2 and B2 are read. Subsequently, in step S78, it is determined whether the SOCa exceeds a predetermined target supplementary charging value Xr. In step S79, it is determined whether the SOCb falls below a predetermined lower-limit supplementary charging value Xs. If the determination results obtained in step S78 and step S79 indicate that the SOCa is lower than or equal to the target supplementary charging value Xr and the SOCb is higher than or equal to the lower-limit supplementary charging value Xs, the process returns to step S76 to continue with the automatic supplementary charging mode.

In contrast, if the determination result obtained in step S78 indicates that the SOCa exceeds the target supplementary charging value Xr or the determination result obtained in step S79 indicates that the SOCb falls below the lower-limit supplementary charging value Xs, the process proceeds to step S80 where the onboard charger 50 is controlled to a stopped state to stop the automatic supplementary charging mode. Subsequently, the process proceeds to step S81 where the main switches SW1a, SW1b, SW2a, and SW2b are switched off. Then, in step S82, the charging switches SW5a, SW5b, SW6a, and SW6b are switched off. By executing the automatic supplementary charging mode in this manner, the battery stacks A2 can be charged by the battery stacks B2, thereby ensuring minimum driving performance immediately after subsequent boarding.

Other Embodiments (Disposition of Battery Cells A3 and B3)

Figure 18:
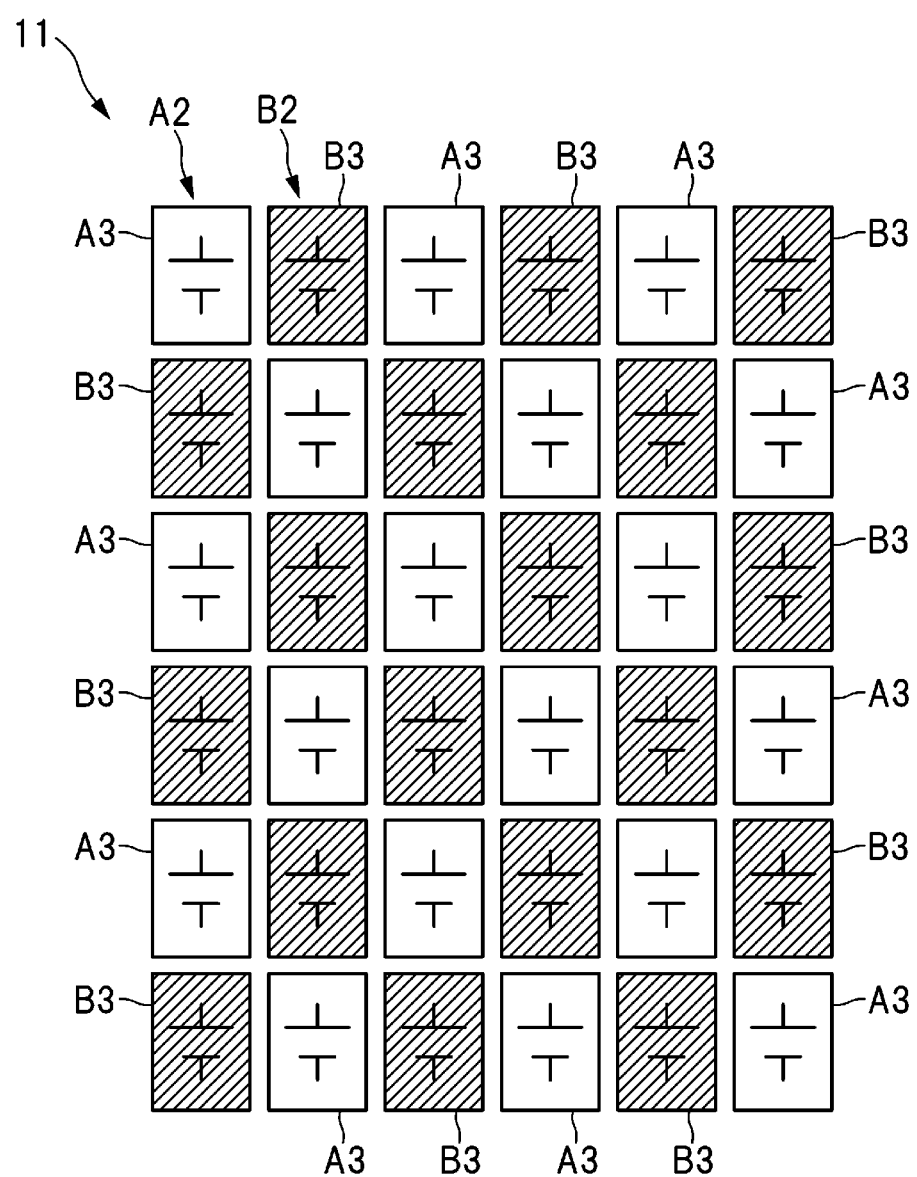
FIG. 18 illustrates an example of the disposition of battery cells.

The following description relates to another example of the disposition of the battery cells A3 and B3 in the battery pack 11. FIG. 18 illustrates an example of the disposition of the battery cells A3 and B3. In FIG. 18, the shaded battery cells are the battery cells B3.

In the above description, the battery stacks A2 and the battery stacks B2 are alternately disposed, as illustrated in FIG. 2. However, the disposition is not limited to the illustrated example. For example, as illustrated in FIG. 18, the battery cells A3 constituting each battery stack A2 and the battery cells B3 constituting each battery stack B2 may be alternately disposed adjacent to each other. Even in the case where the battery cells A3 and the battery cells B3 are alternately disposed in this manner, the battery stacks A2 and B2 can be disposed adjacent to each other, so that the battery stacks A2 can be efficiently warmed by the heat of the battery stacks B2 in the above-described plug-in charging control, whereby the battery stacks A2 can be quickly warmed.

CONCLUSION

The vehicular power supply device 10 according to this embodiment has the battery pack (electric storage unit group) 11 that includes the battery stacks (first electric storage unit) A2 and the battery stacks (second electric storage unit) B2 having the higher internal resistance than the battery stacks A2. The battery pack 11 is coupled to the onboard charger (charger) 50 that charges at least either of the battery stacks A2 and the battery stacks B2. The vehicular power supply device 10 also has the charging switches (first switch) SW5a and SW5b provided between the battery stacks A2 and the onboard charger 50 and the charging switches (second switch) SW6a and SW6b provided between the battery stacks B2 and the onboard charger 50. Moreover, the vehicular power supply device 10 controls the charging switches SW5a, SW5b, SW6a, and SW6b based on the temperature of the battery pack 11.

The charging switches SW5a, SW5b, SW6a, and SW6b are controlled based on the temperature of the battery pack 11 in this manner, so that the battery stacks A2 can be warmed by using the battery stacks B2 even in a low-temperature environment. Accordingly, the battery stacks A2 can be warmed even in a low-temperature environment, so that the charging efficiency of the battery stacks A2 can be enhanced. Furthermore, as illustrated in FIG. 2, the battery stacks A2 and B2 are disposed adjacent to each other, so that the battery stacks A2 can be actively warmed with heat generated from the battery stacks B2.

As described above with reference to step S41 and step S43 in FIG. 11, as well as FIG. 14A, if the average temperature Ta of the battery stacks A2 falls below the threshold value Xk during plug-in charging, the battery stacks A2 are isolated from the onboard charger 50 by switching off the charging switches SW5a and SW5b, and the battery stacks B2 are coupled to the onboard charger 50 by switching on the charging switches SW6a and SW6b. If the temperature of the battery stacks A2 has decreased during plug-in charging in this manner, the battery stacks B2 are charged by the onboard charger 50. Accordingly, the battery stacks B2 can generate heat, so that the battery stacks A2 can be warmed by the battery stacks B2. In addition, the battery stacks A2 can be warmed without using, for example, an electric heater, thereby enhancing the energy efficiency of the vehicle.

Furthermore, as described above with reference to step S41 in FIG. 11, step S49 in FIG. 12, and FIG. 14B, if the average temperature Ta of the battery stacks A2 exceeds the threshold value Xk during plug-in charging, the battery stacks A2 are coupled to the onboard charger 50 by switching on the charging switches SW5a and SW5b, and the battery stacks B2 are isolated from the onboard charger 50 by switching off the charging switches SW6a and SW6b. If the temperature of the battery stacks A2 has increased during plug-in charging in this manner, the battery stacks A2 are charged by the onboard charger 50. Accordingly, the battery stacks A2 can be efficiently charged.

Furthermore, as illustrated in FIG. 8B, the vehicular power supply device 10 is provided with the motor generator (driving motor) 21 coupled to the battery stacks A2 via the inverter 20 and the electric device group 24 coupled to the battery stacks B2 via the converter 22. As described above with reference to step S21 and step S22 in FIG. 7, as well as FIG. 8B, if the average temperature Ta of the battery stacks A2 exceeds the threshold value Xe while the vehicle is running, the charging switches SW5a, SW5b, SW6a, and SW6b are switched on, so that the battery stacks A2 and the battery stacks B2 are coupled in parallel with each other via the onboard charger 50. Accordingly, the load of the battery stacks A2 can be reduced, thereby decreasing the temperature of the battery pack 11.

Although the above description relates to an example where plug-in charging is performed in a low-temperature environment and control is performed for warming the battery stacks A2 by using the heat of the battery stacks B2, this control is not limited to plug-in charging. For example, in a series hybrid vehicle equipped with a power generating engine, the battery stacks A2 may be warmed by using the heat of the battery stacks B2 during series power generation in a low-temperature environment. Furthermore, as an alternative to the above description in which the temperature-increase suppression control and the plug-in charging control are executed by using the average temperature Ta of the battery stacks A2 as the temperature of the battery pack 11, for example, the temperature-increase suppression control and the plug-in charging control may be executed based on the temperature of a specific battery stack A2, or the temperature-increase suppression control and the plug-in charging control may be executed based on the temperature of the battery pack 11.

The present disclosure is not limited to the above embodiment, and permits various modifications so long as they are within the scope of the disclosure. In the above description, the vehicle to which the vehicular power supply device 10 is applied is an electric automobile equipped with the motor generator 21 alone as a power source, but is not limited thereto and may alternatively be a hybrid vehicle equipped with the motor generator 21 and an engine as power sources. Furthermore, the main switches SW1a to SW2b, the selector switches SW3a to SW4b, and the charging switches SW5a to SW6b may each be a switch constituted of a semiconductor element, such as a metal oxide semiconductor field-effect transistor (MOSFET), or a switch that mechanically opens and closes a contact by using an electromagnetic force. The various switches, such as the main switches, are also called relays and contactors.

The battery cells A3 and B3 constituting the battery stacks A2 and B2 may be lithium ion batteries, but are not limited thereto and may alternatively be other kinds of batteries or capacitors. Moreover, the battery cells A3 and B3 may be the same kind of batteries or capacitors, or may be different kinds of batteries or capacitors. Although a single battery stack A2 and a single battery stack1 B2 are alternately disposed in the example illustrated in FIG. 2, the configuration is not limited to this. For example, a stack group having two or more battery stacks A2 and a stack group having two or more battery stacks B2 may be formed, and these stack groups may be alternately disposed adjacent to each other.

In the above description, the SOH indicating the state of degradation of each of the battery stacks A2 and B2 is the current capacity retention rate with respect to the electric storage capacity or the terminal voltage at the time of manufacture, but is not limited thereto. For example, the SOH indicating the state of degradation of each of the battery stacks A2 and B2 may be the current resistance increase rate with respect to the internal resistance at the time of manufacture. In a case where the resistance increase rate is to be used as the SOH in this manner, the internal resistance becomes lower as the battery stack A2 or B2 is in a better condition, so that the SOH is calculated to be a lower value. Furthermore, the SOH indicating the state of degradation of each of the battery stacks A2 and B2 may be a value obtained by integrating the temperatures of the battery stacks A2 and B2.

According to the embodiment of the disclosure, the first switch and the second switch are controlled based on the temperature of the electric storage unit group, so that the first electric storage unit can be charged after the first electric storage unit is warmed by the second electric storage unit.

The vehicular power supply device 10 illustrated in FIG. 1 and FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicular power supply device 10 including the battery pack 11, the onboard charger 50, the charging switches SW5a and SW5b, the charging switches SW6a and SW6b, and the controllers 70 to 74. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1 and FIG. 3.

The invention claimed is:

1. A vehicular power supply device to be applied to a vehicle, the vehicular power supply device comprising:
an electric storage unit group comprising a first electric storage unit and a second electric storage unit configured to have higher internal resistance than the first electric storage unit;
a charger configured to be coupled to the electric storage unit group and charge one or both of the first electric storage unit and the second electric storage unit;
a first switch provided between the first electric storage unit and the charger and configured to be controlled between an on state and an off state;
a second switch provided between the second electric storage unit and the charger and configured to be controlled between an on state and an off state; and
a switch controller configured to control the first switch and the second switch based on a temperature of the electric storage unit group.

2. The vehicular power supply device according to claim 1, wherein
the first electric storage unit and the second electric storage unit are disposed adjacent to each other.

3. The vehicular power supply device according to claim 2, wherein
in a case where the temperature of the electric storage unit group falls below a predetermined threshold value during charging, the switch controller is configured to isolate the first electric storage unit from the charger by controlling the first switch to the off state and couple the second electric storage unit to the charger by controlling the second switch to the on state.

4. The vehicular power supply device according to claim 3, wherein
in a case where the temperature of the electric storage unit group exceeds the threshold value during the charging the switch controller is configured to couple the first electric storage unit to the charger by controlling the first switch to the on state and isolate the second electric storage unit from the charger by controlling the second switch to the off state.

5. The vehicular power supply device according to claim 4, further comprising:
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

6. The vehicular power supply device according to claim 3, further comprising:
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

7. The vehicular power supply device according to claim 2, further comprising:
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

8. The vehicular power supply device according to claim 1, wherein
in a case where the temperature of the electric storage unit group falls below a predetermined threshold value during charging, the switch controller is configured to isolate the first electric storage unit from the charger by controlling the first switch to the off state and couple the second electric storage unit to the charger by controlling the second switch to the on state.

9. The vehicular power supply device according to claim 8, wherein
in a case where the temperature of the electric storage unit group exceeds the threshold value during the charging the switch controller is configured to couple the first electric storage unit to the charger by controlling the first switch to the on state and isolate the second electric storage unit from the charger by controlling the second switch to the off state.

10. The vehicular power supply device according to claim 9, further comprising:
an inverter;
a converter;
a driving motor configured to be coupled to the first electric storage unit via the inverter; and an electric device group configured to be coupled to the second electric storage unit via the converter, wherein in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

11. The vehicular power supply device according to claim 8, further comprising:
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

12. The vehicular power supply device according to claim 1, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

13. The vehicular power supply device according to claim 1, wherein the switch controller is configured to control a switching of the first switch and the second switch when the temperature of the electric storage unit group exceeds a predetermined threshold value.

14. The vehicular power supply device according to claim 1, wherein the switch controller is configured to selectively control each of the first switch and the second switch according to the temperature of the electric storage unit group when charging.

15. A vehicular power supply device to be applied to a vehicle, the vehicular power supply device comprising:
an electric storage unit group comprising a first electric storage unit and a second electric storage unit configured to have higher internal resistance than the first electric storage unit;
a charger configured to be coupled to the electric storage unit group and charge one or both of the first electric storage unit and the second electric storage unit;
a first switch provided between the first electric storage unit and the charger and configured to be controlled between an on state and an off state;
a second switch provided between the second electric storage unit and the charger and configured to be controlled between an on state and an off state;
a switch controller configured to control the first switch and the second switch based on a temperature of the electric storage unit group,
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

16. A vehicular power supply device to be applied to a vehicle, the vehicular power supply device comprising:
an electric storage unit group comprising a first electric storage unit and a second electric storage unit configured to have higher internal resistance than the first electric storage unit;
a charger coupled to the electric storage unit group and configured to charge one or both of the first electric storage unit and the second electric storage unit;
a first switch provided between the first electric storage unit and the charger and configured to be controlled between an on state and an off state;
a second switch provided between the second electric storage unit and the charger and configured to be controlled between an on state and an off state; and
circuitry configured to
control the first switch and the second switch based on a temperature of the electric storage unit group.

17. The vehicular power supply device according to claim 16, further comprising:
an inverter;
a converter;
a driving motor configured to be coupled to the first electric storage unit via the inverter; and
an electric device group configured to be coupled to the second electric storage unit via the converter, wherein
in a case where the temperature of the electric storage unit group exceeds a predetermined threshold value due to charging and discharging of the first electric storage unit when the vehicle is running, the circuitry is configured to couple the first electric storage unit and the second electric storage unit in parallel with each other via the charger by controlling both the first switch and the second switch to the on state.

18. The vehicular power supply device according to claim 16, wherein
in a case where the temperature of the electric storage unit group exceeds a predetermined threshold value due to charging and discharging of the first electric storage unit when the vehicle is running, the switch controller is configured to couple the first electric storage unit and the second electric storage unit in parallel with each other via the charger by controlling both the first switch and the second switch to the on state.

19. The vehicular power supply device according to claim 16, wherein the circuitry is configured to control a switching of the first switch and the second switch when the temperature of the electric storage unit group exceeds a predetermined threshold value.

20. The vehicular power supply device according to claim 16, wherein the circuitry is configured to selectively control each of the first switch and the second switch according to the temperature of the electric storage unit group when charging.

* * * * *